Oct. 19, 1965    L. BALAMUTH ETAL    3,212,491
METHOD AND APPARATUS FOR TRUEING AND FORMING THE
WORKING SURFACE OF A GRINDING WHEEL
Filed Aug. 21, 1961     8 Sheets-Sheet 1

INVENTORS
LEWIS BALAMUTH &
ARTHUR KURIS
BY
their ATTORNEYS

Oct. 19, 1965    L. BALAMUTH ETAL    3,212,491
METHOD AND APPARATUS FOR TRUEING AND FORMING THE
WORKING SURFACE OF A GRINDING WHEEL
Filed Aug. 21, 1961                 8 Sheets-Sheet 2
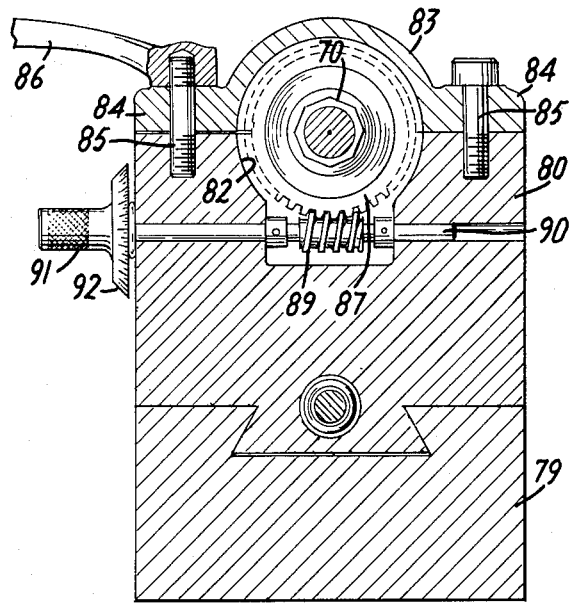
FIG. 3
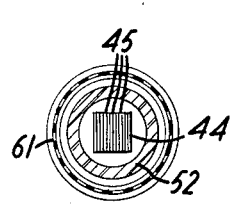
FIG. 4
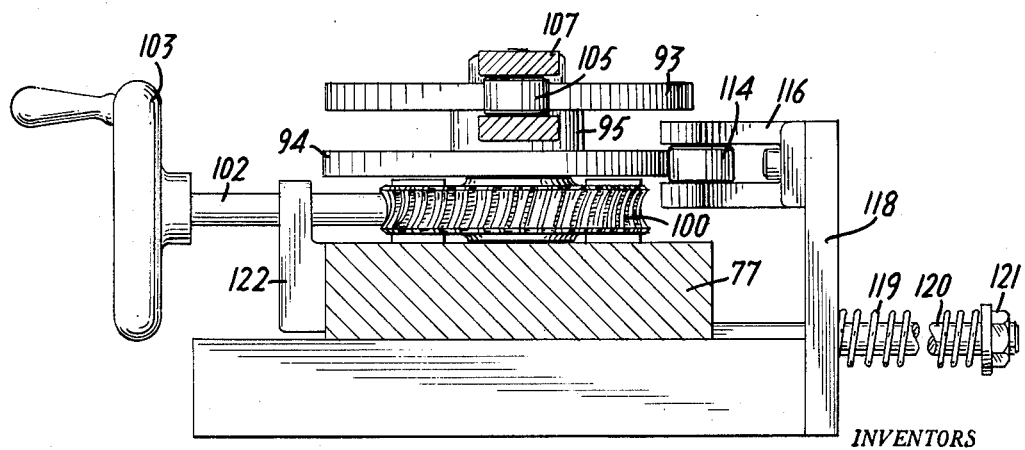
INVENTORS
LEWIS BALAMUTH &
ARTHUR KURIS
BY
Brumbaugh, Free, Graves & Donohue
their ATTORNEYS Oct. 19, 1965     L. BALAMUTH ETAL     3,212,491
METHOD AND APPARATUS FOR TRUEING AND FORMING THE
WORKING SURFACE OF A GRINDING WHEEL
Filed Aug. 21, 1961     8 Sheets-Sheet 3

INVENTORS.
LEWIS BALAMUTH &
ARTHUR KURIS
BY their ATTORNEYS

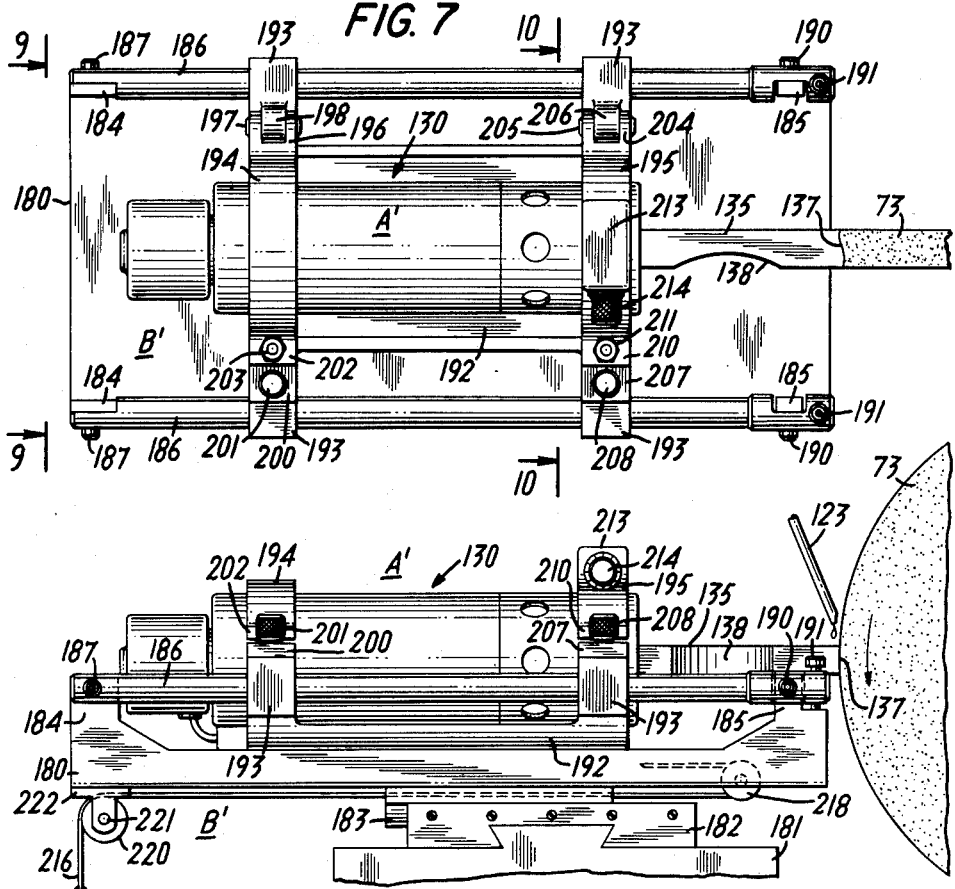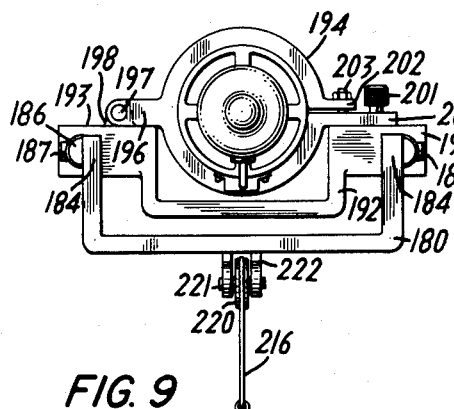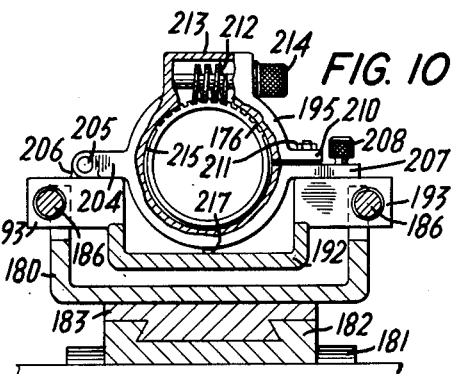

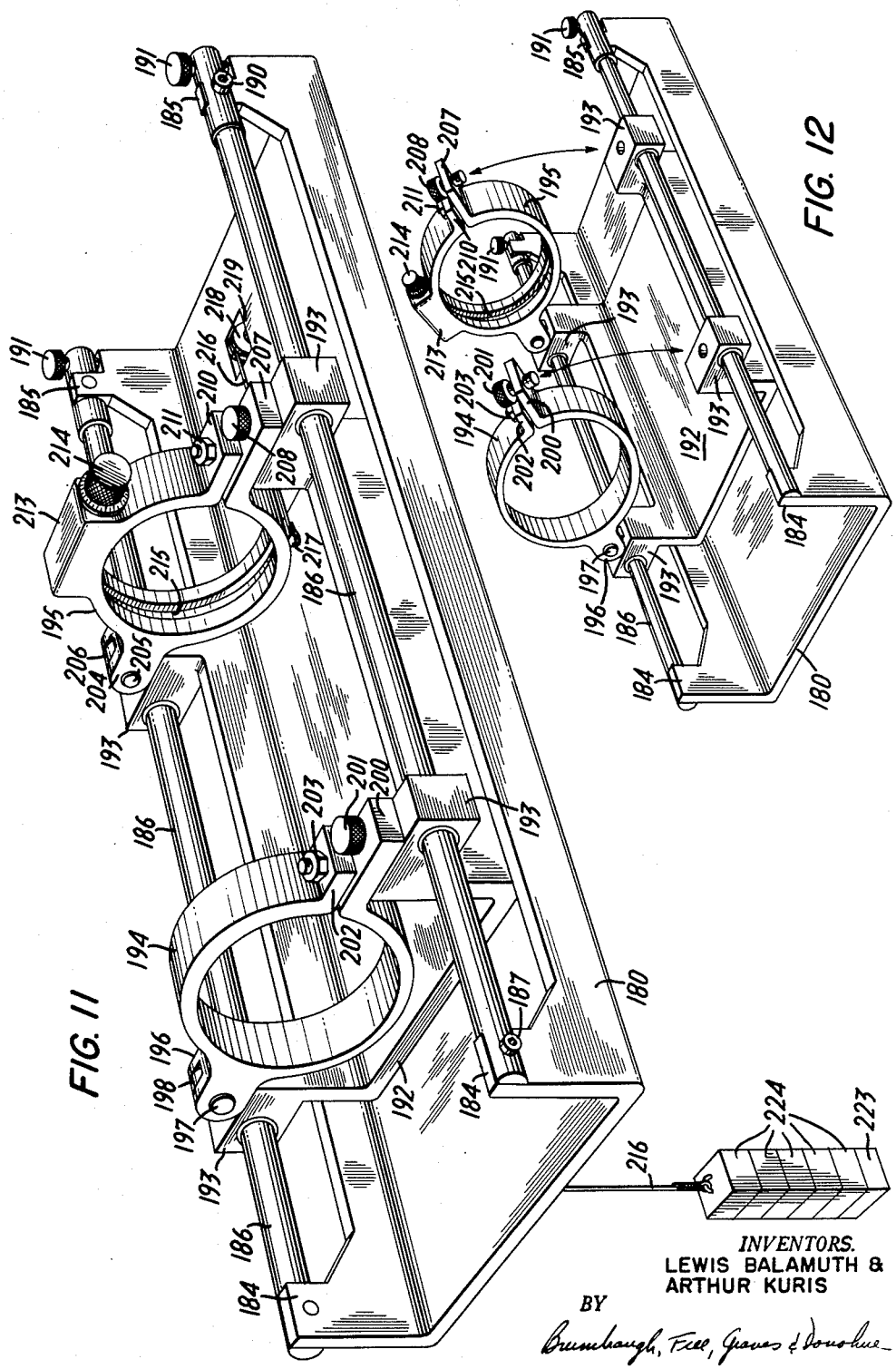
INVENTORS.
LEWIS BALAMUTH &
ARTHUR KURIS

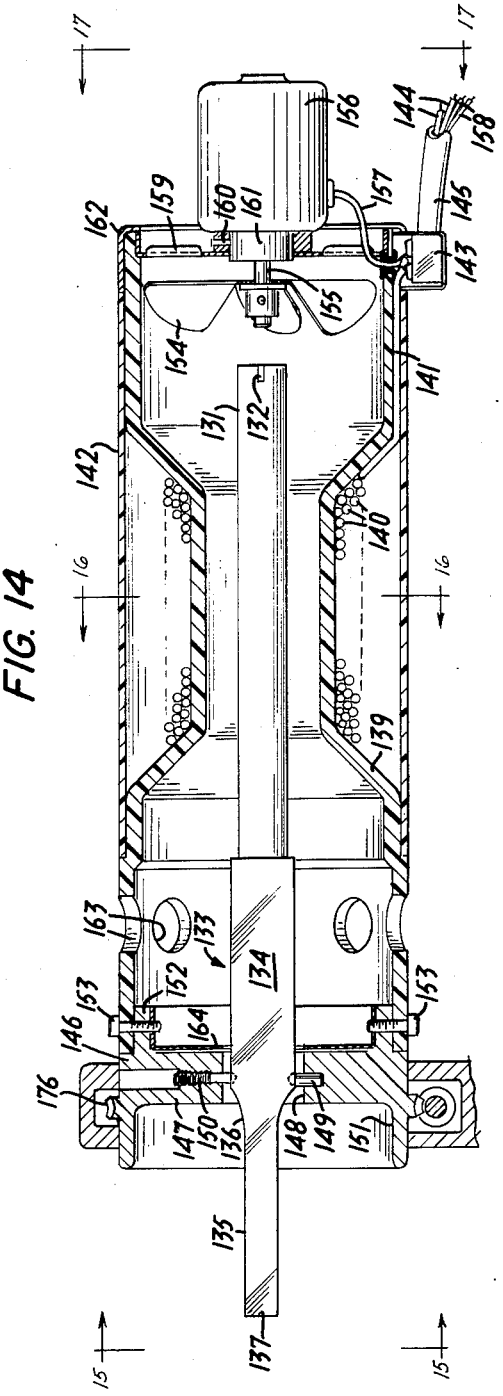

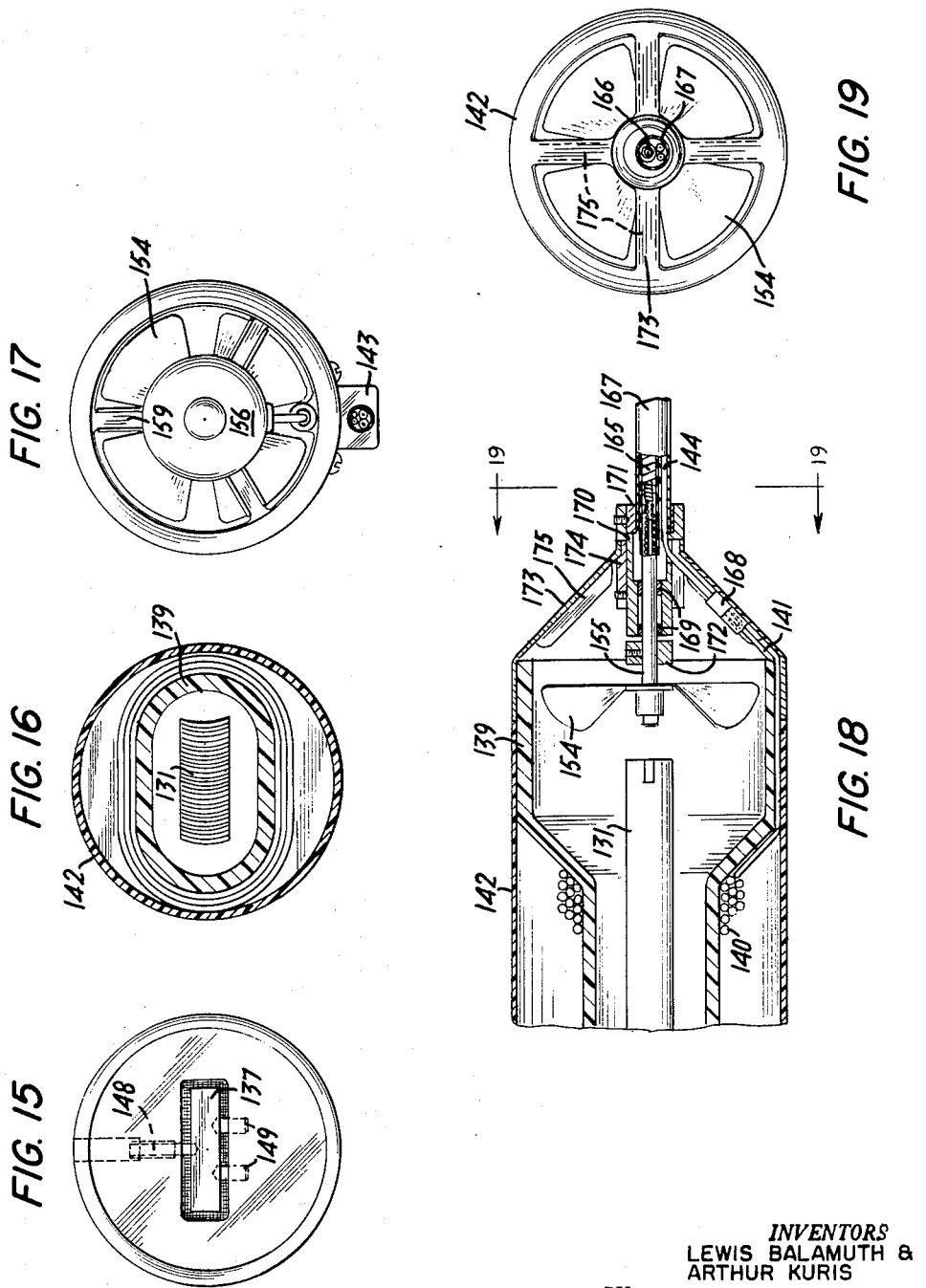

Oct. 19, 1965   L. BALAMUTH ETAL   3,212,491
METHOD AND APPARATUS FOR TRUEING AND FORMING THE
WORKING SURFACE OF A GRINDING WHEEL
Filed Aug. 21, 1961   8 Sheets-Sheet 8
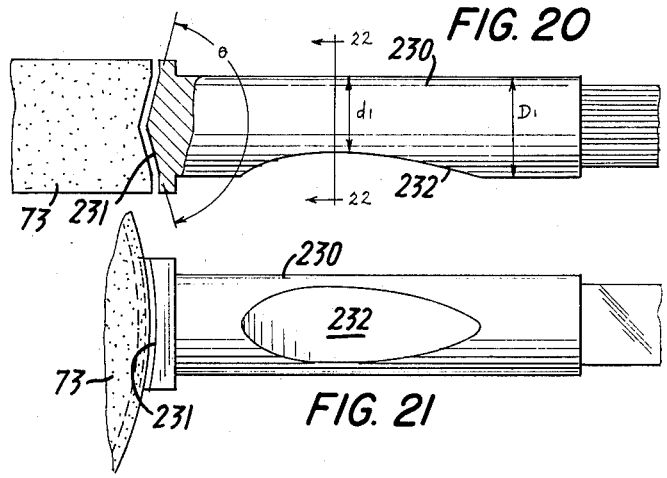
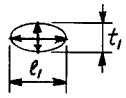
FIG. 23
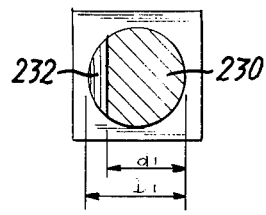
FIG. 22
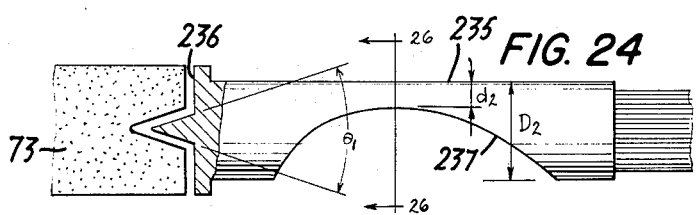
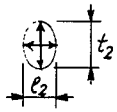
FIG. 27
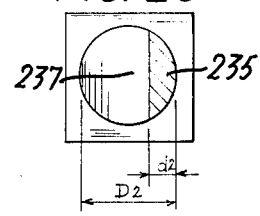
FIG. 26
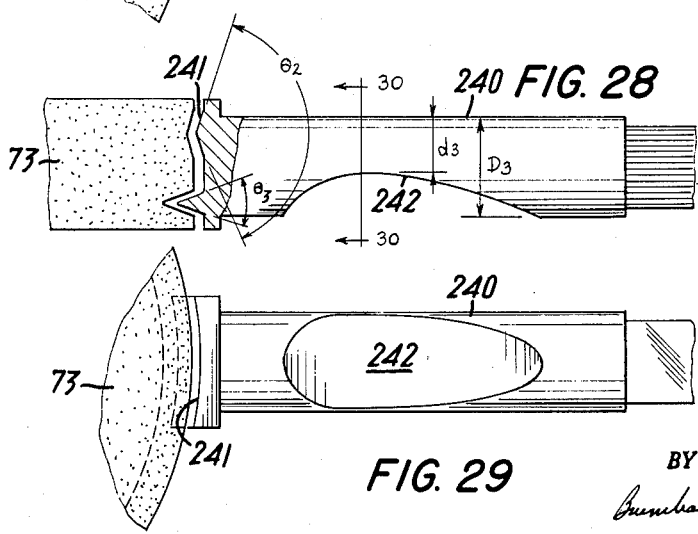
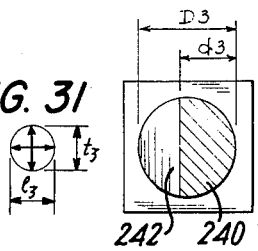
FIG. 30
FIG. 31
INVENTORS
LEWIS BALAMUTH &
ARTHUR KURIS
BY
their ATTORNEYS though this invention relates to the art of trueing and forming grinding wheel surfaces, and more particularly to improved methods and devices for forming and trueing grinding and polishing surfaces of abrasive wheels to the exact contour and shape required for precision grinding and polishing operations.

United States Patent Office 3,212,491
Patented Oct. 19, 1965

3,212,491
METHOD AND APPARATUS FOR TRUEING AND FORMING THE WORKING SURFACE OF A GRINDING WHEEL
Lewis Balamuth and Arthur Kuris, New York, N.Y., assignors to Cavitron Corporation, Long Island City, N.Y., a corporation of New York
Filed Aug. 21, 1961, Ser. No. 132,685
15 Claims. (Cl. 125—11)

This invention relates to the art of trueing and forming grinding wheel surfaces, and more particularly to improved methods and devices for forming and trueing grinding and polishing surfaces of abrasive wheels to the exact contour and shape required for precision grinding and polishing operations.

Where the surfaces of machine parts and components, formed from various metals, plastics or other hard materials, must be precisely shaped and contoured before assembly into the machine or apparatus of which they will form a component part, it is the customary practice to grind and/or polish the workpiece surface to the required surface contour and texture by the use of various types and kinds of abrasive wheels. Such abrasive wheels are composed of coarse or fine grains of abrasive material bonded together by a plastic bonding compound or by sintering. To shape and contour the workpiece surface to the required precision accuracy, the working periphery or working surface of the abrasive wheel used must accordingly possess a corresponding precise contour. Since the abrasive grains at the working surface are gradually worn away during the grinding and polishing operation, the working surface must be periodically trued and re-formed to restore the same to the required precise contour.

Two methods are presently used to true and re-form the working surface of abrasive wheels to the required contour accuracy. In one method, a crushing wheel having an appropriately shaped surface contour and surfaced by a very hard material such as a hardened metal alloy, tungsten carbide or diamond particles, is pressed into riding contact with the working surface of the abrasive wheel with sufficient force to crush and pulverize the surface grains of the rotating abrasive wheel until the desired working surface contour is attained. Since such crushing wheels must maintain precise surface accuracy, with tolerances normally in the order of one to two ten-thousandths of an inch, and since the crushing wheel must be pressed against the grinding wheel at very high pressures in order to effect grain pulverization of the working surface, such crushing wheels are very costly to manufacture and maintain in precise surface contour. Due to the high pressures with which such crushing wheels must be applied to the working surface of the abrasive wheel, crushing wheels can only be effectively used for the reforming and trueing of sinter bonded types of abrasive wheels. The application of such necessarily high pressures often produces abrasive wheel fractures, or a weakening of the sintered bond between its useful abrasive grains, which impairs its further usefulness.

The second method presently used in trueing and forming the working surface of abrasive wheels, involves the use of a tungsten carbide tipped or diamond tipped trueing tool, which is expensive in first cost, and which must also be applied against the working surface with substantial pressure, as the tool face is held stationary or moved transversely across the rotating working surface. The work face or point of such diamond tipped or tungsten carbide tipped trueing tools as presently used, are nevertheless subjected to rapid wear, and the cutting tips are often broken, which results from the substantial pressures which must be applied by the tool tip against the working surface to effectuate the trueing operation. Rapid wear of the tool tip requires frequent tool tip replacement, if the working surface is to be trued to the required precision accuracy.

It is an object of this invention to provide an improved method and means for re-forming and trueing the working surfaces of abrasive wheels with greater precision, in less time and at less cost than can be accomplished with presently used methods and means, with substantially less wear on the working face or tip of the trueing tool, with a minimum removal of useful abrasive grains from the working surface during trueing and re-forming thereof, and without damage to or weakening of the bonding matrix which holds the useful abrasive grains at the working surface of the abrasive wheel. The methods and means of this invention are also applicable to the precise trueing and forming of both sinter bonded and plastic bonded abrasive wheels, so that only one trueing and re-forming instrumentality need be used. Abrasive wheel trueing devices made in accordance with this invention, can be mounted on a convenient part of the grinding machine, so that the contact face or tip of the trueing tool can be quickly brought into trueing position whenever the abrasive wheel associated with the grinding machine requires trueing and re-forming.

In accordance with this invention, the working periphery or surface of abrasive grinding and polishing wheels may be effectively trued in minimum time to precision accuracy by the use of a vibrator assembly which includes a vibrator unit having a trueing tool or head rigidly attached to the end thereof, and whose working face or tip reversely conforms to the desired contour to be formed on the working surface of the abrasive wheel. The vibrator unit is energized to vibrate at a preferred frequency of less than twenty thousand cycles per second, and preferably in the order of five to twenty thousand cycles per second, and at a preferred amplitude in the order of one to two thousandths of an inch or less. The working or contact face of the trueing tool or head as rigidly attached to the end of the vibrator unit, is relatively lightly pressed into contact with the working surface to be trued, with a pressure in the order of one to twenty pounds. During the trueing operation, the abrasive wheel is rotated at relatively low peripheral speed, and in the order of less than one foot to a preferred maximum of less than five feet per second. A liquid coolant is applied to the wheel periphery during the trueing and forming thereof.

The working surface of the abrasive wheel is trued and re-formed to the desired precise shape and contour by the impacting action of the tool contact face, which operates to loosen or pulverize only those abrasive grains at the working surface which do not reversely conform to the impact or shaping face of the vibrating trueing tool or head. The impact strokes apply a series of relatively light impacts against the irregular projecting grains on the working surface, with a force which approximately corresponds to the relatively low pressure force externally applied to the vibrator assembly, and which applied pressure is only sufficient to effect pulverization or loosening of the projecting abrasive grains from the grain bonding material. The accomplishment of this desirable result may be ascribed to the frequency of repetitive impacts delivered to the projecting and non-contour conforming abrasive grains as they move across the contact face of the trueing tool or head.

The physical removal and flushing away of the pulverized or loosened abrasive grains is facilitated by the cavitational action of a liquid coolant applied to the working surface of the abrasive wheel and which forms a liquid layer at the trueing site and between the vibrating contact face of the trueing tool or head and the adjacent trueing site area of the slowly moving working surface.

Since the abrasive wheel is rotated at relatively low speed during the trueing operation, a sufficient layer of water will normally adhere to the working surface of the abrasive wheel at the trueing site to assure effective cavitational action thereof. However, if the cooling liquid such as water cannot readily be maintained in the form of a surface layer at the trueing site, a detergent or wetting liquid having low surface tension with adhering and spreading properties, may be used as the cooling liquid.

Where the peripheral surface to be trued is relatively flat, or otherwise presents obtuse angled grooves or ridges, a vibrator unit may be employed which is formed and shaped to deliver substantially longitudinal impact strokes to the contact face of the trueing tool or head, and which operates to apply grain loosening impacts which are directed substantially at right angles to the axis of rotation of the abrasive wheel. However, where the working surface to be trued has substantial contour irregularity crosswise thereof, and presents acute angled grooves or ridges whose sides are relatively steep or actuately inclined, it is obvious that the contoured face of the trueing tool or head which has a longitudinal stroke component only, may not be effective to precisely true the acutely inclined sides of such grooves or ridges, unless the contoured contact face of the trueing tool or head also has a lateral as well as a longitudinal component of motion, with the contact face executing a circular, elliptical or like orbital motion pattern.

The method and instrumentalities of this invention are so designed and can be so used and applied that any desired orbital or elliptical motion pattern may be engendered at the contact face of the trueing tool or head. Selected elliptical, circular or orbital motion features can be built into the vibrator unit of the vibrator assembly in accordance with this invention to meet the precise contour requirements of the peripheral surface to be trued and reformed, and so that abrasive wheels having the most irregular peripheral contour may be presicely shaped to conform to the most exacting requirements.

In accordance with this invention the vibrator assembly and its vibrator unit to which the trueing tool or head is attached, may be adjustably supported by a mounting structure attached to a part of almost any type of grinding or polishing machine, and so mounted that the contact face of the vibrated trueing tool or head may be quickly moved into trueing contact with the working surface of the abrasive wheel whenever trueing or re-forming of its working surface is required. Where the peripheral or working surface of the abrasive wheel is such as to be best trued by a trueing tip or point, which is moved laterally across the width of the peripheral working surface to complete the trueing operation, this invention makes provision for a vibrator assembly mounting structure equipped with adjustable means for applying a selected pressure force on the supported vibrator assembly which insures the optimum contact pressure between the vibrating tool tip and the working surface. This invention also comprehends the provision of cam means operative to automatically move the vibrating working point of the trueing tool across the peripheral width of the abrasive wheel in the precise path required by the geometrical contour to which the peripheral surface must be trued.

In such cases where it is desirable to simultaneously true the entire peripheral width of the abrasive wheel, without lateral travel of the trueing tool, this invention contemplates the provision of a vibratory trueing tool whose contact face precisely conforms in reverse to the geometrical contour at which the abrasive wheel periphery is to be trued. In such cases the vibratory assembly of this invention has a mounting structure which includes adjustable means to maintain the contact face of the vibrating trueing tool against the abrasive wheel periphery at the preferred contact pressure, and with means for holding the vibrator assembly in stationary position during the trueing operation, and yet permitting the vibrator assembly to be swung into such a position that the vibratory unit and trueing tool connected thereto can be readily removed from the assembly and replaced.

In accordance with the principles of this invention, the projecting or non-contour conforming grains of the abrasive wheel are loosened or pulverized by impact action, rather than by crushing action as characteristically attained by the use of a crushing wheel, or by the scraping action characteristically attained by the use of a non-vibratory trueing tool. Since the pressure force required to maintain the contact face of the vibrating tool of this invention in operative impacting relation to the projecting or non-conforming grains of the working surface, is relatively nominal, and only a small fraction of the high pressure required to maintain a crushing wheel or non-vibratory crushing tool in operative and effective trueing relation to the working surface, a number of important advantages are attained as follows:

First, only the projecting or non-contour conforming surface grains of the working surface are loosened or pulverized when the method and instrumentalities of this invention are used, with the result that the useful abrasive grains are not damaged or loosened and the abrasive wheel cannot be fractured or damaged. As a consequence, the abrasive wheel has a much longer useful life when trued by the method and with the instrumentalities of this invention.

Secondly, since only a small amount of pressure is applied to the contact face of the vibrating trueing tool, the trueing tool face maintains its precise geometrical shape with less wear for a longer trueing period than heretofore considered possible. This favorable condition permits the use of trueing tools and trueing heads in association with the vibrator unit, which may be formed of less expensive and only reasonably hard and wear-resistant tool, steel or metal alloys which are readily available, and having the requisite toughness and a hardness in the order of sixty to seventy Rockwell. This desirable attribute additionally insures substantially longer use life and a geometrical conformity of the contact face of the trueing tool. If the contact face of the trueing tool or head is formed of such customarily used materials, as tungsten carbide or embedded industrial diamond dust, the trueing tool as applied to the vibratory unit will maintain its precise geometrical conformity for a substantially longer period of use.

As a third advantage never heretofore achieved, the vibrator unit may be designed and constructed in accordance with this invention to apply predetermined, elliptical, circular or orbital motions to the contact face of the trueing tool attached thereto, and whereby precise trueing of steeply sloped contour segments may be effected while simultaneously trueing those surface segments which are substantially parallel or inclined at only a mild angle to the axis of rotation of the abrasive wheel. This important advantage makes possible the precise trueing and re-forming of the most irregularly contoured working surfaces, and which could heretofore only be trued by the use of intricate tools and the most painstaking and time-consuming labor.

As a fourth advantage, precision trueing operations can be performed by the use of the methods and instrumentalities of this invention, with a minimum of attention on the part of the machine operator, and with the assurance that the working surface will be shaped to precise contour. More accurate and precise grinding and polishing work can consequently be performed on the workpieces to be shaped, ground or polished, with minimum time spent in trueing and re-forming, and with maximum time devoted by the machine operator in performing useful production work.

Other objects and advantages of this invention will become apparent as the disclosure proceeds.

Although the characteristic features of this invention will be particularly pointed out in the claims, the invention itself, and the manner in which it operates may be better understood by referring to the following description taken in connection with the accompanying drawings forming a part hereof, in which:

FIG. 1 is a perspective view of an abrasive wheel trueing and forming device constructed in accordance with this invention, shown in association with a fragmentary part of an abrasive wheel and a fragmentary part of a grinding machine table on which the device is mounted, this view showing one form of vibrator assembly supporting a trueing tool whose tip is in operating contact with the peripheral surface of the abrasive wheel, with the vibrator assembly supported from the machine table by a mounting structure which incorporates means for maintaining the tip of the trueing tool in predetermined pressure contact with the abrasive wheel surface, and means for effecting contour travel of the tool tip across the width of the peripheral surface of the abrasive wheel in geometrical conformity to the precisely contoured working surface desired;

FIG. 3 is a transverse section of the device shown in FIGS. 1 and 2 as the same would appear when viewed in the direction of the arows along line 3—3 of FIG. 2;

FIG. 4 is another transverse section of this device as the same would appear when viewed in the direction of the arrows along line 4—4 of FIG. 2;

Figure 1:
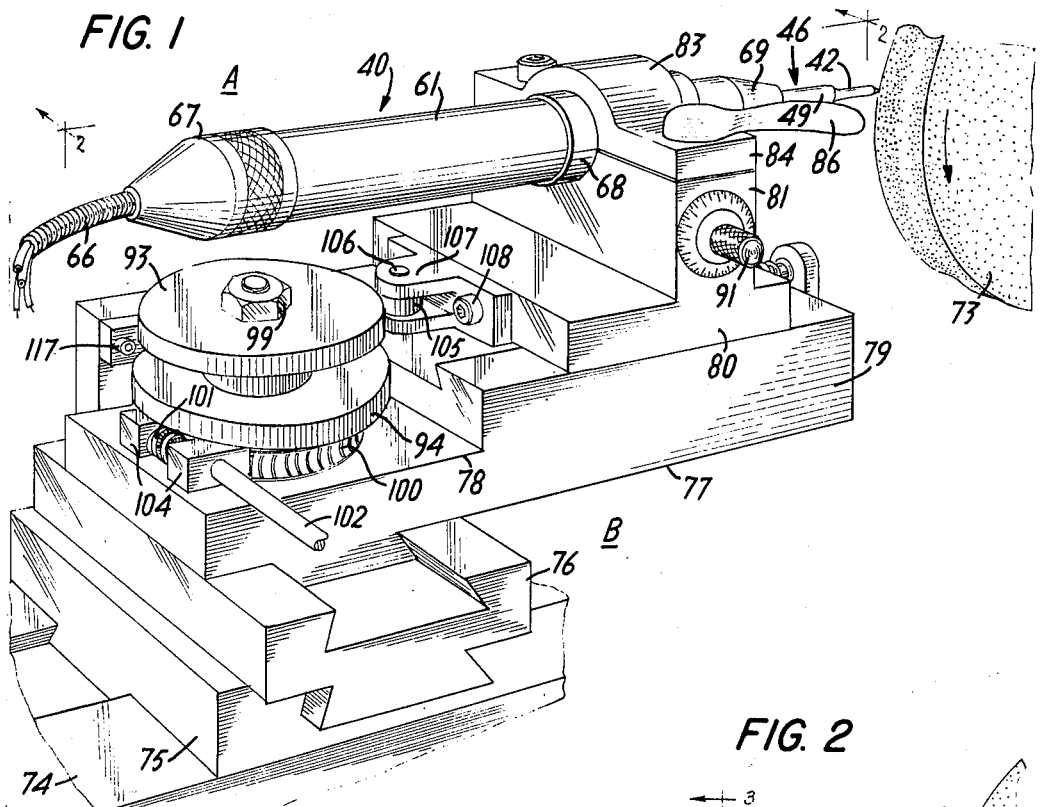
Figure 2:
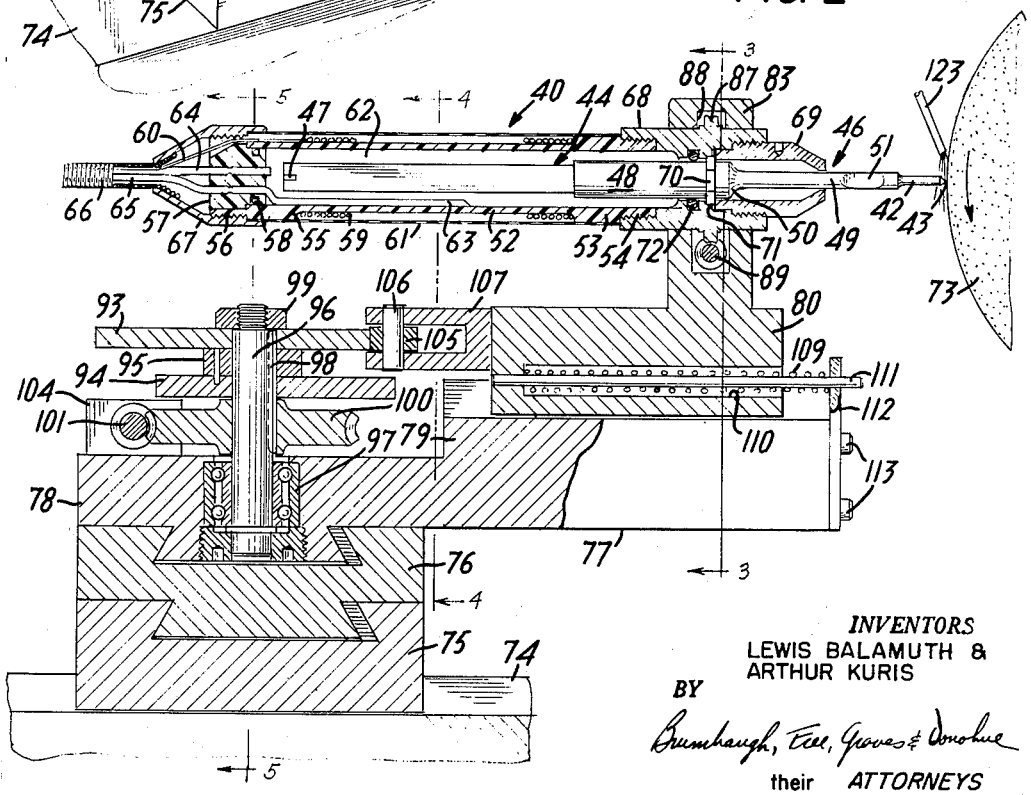
FIG. 2 is a longitudnal section of the device shown in FIG. 1 as the same would appear when viewed along line 2—2 of FIG. 1.
Figure 5:
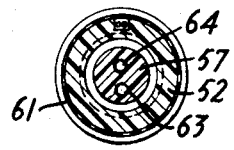
Figure 6:
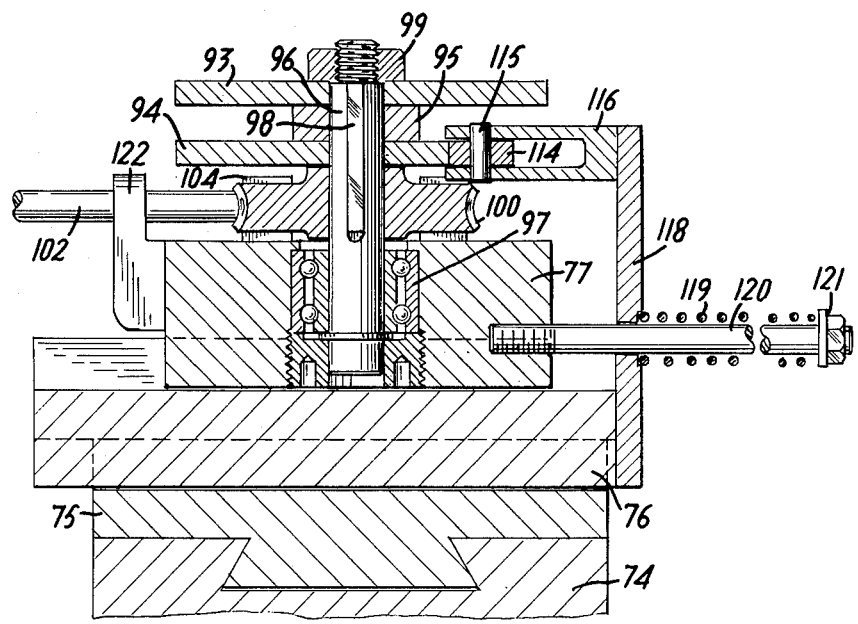

FIG. 5 is still another transverse section of this device as the same would appear when viewed in the direction of the arrows along line 5—5 of FIG. 2; and FIG. 6 is a diagrammatic illustration of the cam means associated with the device shown in FIGS. 1-5 and which illustrates one of the many cam forms which can be used to insure precise contour travel of the trueing tool tip across the peripheral surface of the abrasive wheel.

FIG. 7 is a top plan view of another form of trueing device made in accordance with this invention and which incorporates a vibrator assembly designed to support a trueing tool whose contact face width substantially conforms to the contoured width of the peripheral surface of the abrasive wheel to be trued, and a mounting structure for the vibrator assembly which incorporates means for maintaining the working face of the trueing tool under predetermined contact presure against the peripheral surface of the abrasive wheel, and means for swinging the vibrator assembly into a position which facilitates removal of the vibrator unit and trueing tool from the vibrator assembly;

FIG. 8 is a side elevational view of the trueing device shown in FIG. 7, this view showing the contact face of the trueing tool in working relation to the peripheral surface of the abrasive wheel.

FIG. 9 is a tail end view of the trueing device shown in FIGS, 7 and 8 as the same would appear when viewed in the direction of the arrows along line 9—9 of FIG. 7;

FIG. 10 is a transverse section of the trueing device shown in FIGS. 7 and 8 as the same would appear when viewed in the direction of the arrows along line 10—10 of FIG. 7;

FIG. 11 is a perspective view of the mounting structure shown in FIGS. 7-10 as the same would appear when the vibrator assembly is removed therefrom; and FIG. 12 is a perspective view of the vibrator assembly mounting structure shown in FIG. 11 as the same would appear when the vibrator assembly supporting rings have been swung into vibrator assembly removal position.

FIG. 13 is a side view partly in section of the vibrator assembly shown in FIGS. 7 and 8 and as the same would appear when removed from the mounting structure;

FIG. 14 is a longitudinal section of the vibrator assembly as the same would appear when viewed along line 14—14 of FIG. 13;

FIG. 15 is an end view of the head of the vibrator assembly shown in FIGS. 13 and 14 and as the same would appear when viewed in the direction of the arrows along line 15—15 of FIG. 14;

FIG. 16 is a transverse section of the vibrator assembly as the same would appear when viewed in the direction of the arrows along line 16—16 of FIG. 14; and FIG. 17 is an end view of the tail end of the vibrator assembly as the same would appear when viewed in the direction of the arrows along line 17—17 of FIG. 14.

FIG. 18 is a fragmentary longitudinal section of a vibrator assembly whose construction substantially conforms to the vibrator assembly shown in FIGS. 13 and 14, but whose cooling fan at the tail end of the vibrator assembly is rotated by a flexible driving cable rather than a driving motor; and FIG. 19 is a transverse section of the modified vibrator assembly shown in FIG. 18 as the same would appear when viewed in the direction of the arrows along line 19—19 of FIG. 18.

FIG. 20 is a fragmentary top plan view of another form of vibrator unit made in accordance with this invention, this view showing the working head thereof in section and having a working face which executes a generally elliptical motion pattern, to thereby form a relatively shallow groove in the working periphery of the abrasive wheel, and which elliptical motion is engendered by making the connecting body of the vibrator unit in the shape and form shown in this figure;

FIG. 21 is a side view of the instrumentality shown in FIG. 20, this view showing a side view of the connecting body of the vibrator unit and the trueing head attached thereto in operative relation to the abrasive wheel, this view illustrating further details of the shape and form of the connecting body which delivers elliptical motion to the impact face of the trueing head;

FIG. 22 is a transverse section of the connecting body of the vibrator unit shown in FIGS. 20 and 21 and as the same would appear when viewed in the direction of the arrows along line 22—22 of FIG. 20; and FIG. 23 is a diagrammatic representation of the elliptical motion pattern executed by the contact face of the trueing head shown in FIGS. 20 and 21 when this trueing head is fixed to a vibrator unit whose connecting body is shaped and formed as indicated in FIGS. 20, 21 and 22.

FIG. 24 is a top plan view of a further modified form of connecting body which is incorporated as an integral part of a vibratory unit, and whose attached trueing head is shown in section and presents a geometrical contour designed to form a relatively steep groove in the peripheral surface of the abrasive wheel when vibrated to execute a particular elliptical motion pattern engendered by a connecting body shaped and formed as shown in this figure;

FIG. 25 is a side elevational view of the instrumentality shown in FIG. 24, this view showing further details of the shape and form of the connecting body and trueing head as rigidly attached to this connecting body and in trueing relation to the working periphery of an abrasive wheel whose working surface is to be steeply grooved;

FIG. 26 is a transverse section of the connecting body shown in FIGS. 24 and 25 as the same would appear when viewed in the direction of the arrows along line 26—26 of FIG. 24; and FIG. 27 is a diagrammatic representation of the elliptical motion pattern produced at the contact face of the trueing head shown in FIGS. 24 and 25 when the connecting body of the vibrator unit from which it is supported is shaped and formed as shown in FIGS. 24, 25 and 26.

FIG. 28 is a top plan view of a further form of connecting body forming a part of a vibrator unit, and whose working head is sectionally shown in approximate operating relation to the peripheral surface of an abrasive wheel having the irregularly contoured shape shown in this figure, and which connecting body is so shaped and formed as to vibrate the contact face of the trueing head in a substantially circular motion pattern best suited to effectuate the precise contour trueing of an abrasive wheel periphery whose cross-sectional shape corresponds to that shown in this figure;

FIG. 29 is a side elevational view of the instrumentality shown in FIG. 28, this view showing further details of the shape and form of the connecting body and trueing head as rigidly attached thereto and in trueing relation to the working periphery of an abrasive wheel whose working surface is to be contoured as shown in FIG. 28;

FIG. 30 is a transverse section of the connecting body as the same would appear when viewed in the direction of the arrows along line 30—30 of FIG. 28; and FIG. 31 is a diagrammatic illustration of the orbital motion pattern produced at the contact face of the trueing head when the connecting body of the vibrator unit is shaped in substantial conformity to that shown in FIGS. 29 and 30.

Similar reference characters refer to similar parts throughout the several views of the drawings and specification.

This invention contemplates the provision of abrasive wheel trueing devices of two different types. In the type illustrated in FIGS. 1–6, the vibrator assembly A is supported on a mounting structure B equipped with cam means 93 and 94 operative to move the vibrator assembly A and its associated vibrator unit 40 and trueing tool 42 attached thereto, in a lateral direction and transversely across the peripheral working surface of the abrasive wheel to be trued, as well as in a direction normal to the peripheral working surface to be trued, to thereby precisely true and re-form the peripheral working surface of the abrasive wheel in accordance with a particular geometrical pattern established by the cam means associated with the mounting structure. The other type of trueing device made in accordance with this invention and shown in FIGS. 7–31 for purposes of illustration, incorporates a mounting structure B' which supports the vibrator assembly A' and its associated vibrator unit 130 and attached trueing tool or head, without travel laterally across the working surface of the abrasive wheel. When this type of device is used, the trueing tool contact face is formed to the desired geometrical shape to true and reform the entire peripheral working surface, as shown in FIGS. 7, 13, 14, 20, 24 and 28, without lateral travel thereof.

Where the peripheral working surface of the abrasive wheel can best be trued by moving the trueing tool or head laterally across the peripheral working surface of the abrasive wheel as illustrated in FIGS. 1 and 2, a working tool 42 would normally be used which presents a working tip 43 having either a relatively sharp or blunt point or end face as illustrated in FIGS. 1 and 2. The trueing tool 42 is attached to the output of a vibrator unit 40 which comprises a transducer section 44 rigidly connected to the input end of the amplitude magnifying connecting body or acoustical impedance transformer 46, and whose output end is in turn rigidly connected to the treuing tool 42.

The transducer section 44 of the vibrator unit 40 may be any one of a number of electrical mechanical types, such as electrodynamic, piezoelectric, or magnetostrictive. However, at an operating frequency of not more than fifteen thousand cycles per second, with a preferred operating frequency in the order of five thousand to ten thousand cycles per second, the transducer section 44 is preferably the magnetostrictive type. The transducer section may be composed of a stack of metal plates 45 as shown in FIG. 4, each of which is formed from a metal such as permanickel, Permerdur or other metal having high tensile strength and highly magnetostrictive in character, so that the transducer section 44 will longitudinally vibrate to a maximum degree when subjected to the influence of an alternating magnetic field. The stacked metal plates 45 which compose the transducer section 44 may be compactly held in assembled relation by means of an insert slug 47, set within a conforming slot extending transversely across the plate stack at the free end thereof, and bonded into position by silver solder.

The input end of the connecting body or acoustical impedance transformer 46 is rigidly secured as by silver solder to the adjacent output end of the transducer section 44, and its other end may be integrally or detachably but rigidly secured to the trueing tool 42. To amplify the vibrational strokes delivered to it by the transducer section, the connecting body 46 may have an enlarged diameter body section 48 which is directly attached to the transducer section 44, and a reduced diameter body section 49 integrally joined to the enlarged diameter body section 48 by tapered neck section 50. In the event the trueing operation can be most effectively performed if the working tip 43 of the trueing tool 42 executes a generally elliptical, circular or orbital motion pattern, a flexure producing depression 51 may be formed in the side of the reduced diameter body section 49 as shown in FIG. 2. The flexure producing depression 51 is of such predetermined shape and form as to establish the desired orbital motion at the working end of the trueing tool, as hereafter more fully explained.

The connecting body 46 should be made of a strong metal such as tool steel, Monel metal, titanium, Phosphor bronze, brass, beryllium, copper or the like having high tensile strength. The trueing tool 42 may be formed from similar metal and integrally formed therewith. Alternatively, the trueing tool 42 may be formed of a metal different from the metal of the connecting body 46, but characterized by high tensile strength and maximum wear resistance, and then rigidly secured to the output end of the connecting body 46 as by welding or soldering. It is also appreciated that the working tip or end face of the trueing tool 42 may be formed of or surfaced with a particularly hard and wear-resistant material such as tungsten carbide, industrial diamonds or the like, so that the working end face of the trueing tool will maintain its precise geometrical shape substantially indefinitely.

The transducer section 44 of the vibrator unit 40 should have a length corresponding to one-half wavelength or multiples thereof at the vibration frequency of the transducer section; and the connecting body 46 combined with the trueing tool 42 should have a length corresponding to one-half wavelength or multiples thereof at the vibration frequency of the transducer section 44. The vibrator unit 40, comprising the transducer section 44, and connecting body 46 taken together with the trueing tool 42, should be designed to produce longitudinal motion strokes at the working or contact end 43 of the trueing tool 42, which are of a length in the order of one to two thousandths of an inch or less. The length of the longitudinal motion strokes as well as the length of the lateral motion strokes may be designed into the vibrator unit 40 in accordance with the metals from which it is formed, the acoustical characteristics of the metal, the frequency of vibration, and the shape and form of its components. The amplitude or length of the longitudinal motion strokes which should be designed into the vibrator unit 40 for most effective trueing action, is determined by the grain size and grain hardness, as well as the characteristics of the grain bonding matrix, which compose the working surface of the abrasive wheel.

The transducer section 44 and a major part of the connecting body 46 of the vibrator unit 40 are contained within tubular casing 52 formed of a non-magnetic and non-electrical conducting material such as nylon or like moldable plastic compound as shown in FIG. 2. The tubular casing 52 is provided with an enlarged diameter boss section 53 at the head end thereof which terminates in an externally threaded extension 54. The tail end of the tubular casing 52 likewise presents an enlarged diameter boss section 55 which terminates in an externally threaded extension 56. The tail end of the tubular casing 52 is sealed by a closure plug 57 which supports a resilient sealing ring or gasket 58 partially inset within a circumferential groove formed in the closure plug 57, and which makes sealing contact with the inside face of the tubular casing 52.

An enamel coated wire 59 is wound around the body section of the tubular casing 52 as shown in FIG. 2, with the lead wires 60 extending from the winding 59 through a slot formed in the boss section 55 and closure plug 57. A tubular protective jacket 61 encloses the wire winding 59, and is supported by the enlarged boss sections 53 and 55 at the head end and the tail end of the tubular casing 52. Biased alternating current of selected frequency, produced by a biased alternating current generator (not shown), is connected to the lead wires 60 and supplies a biased alternating current of predetermined frequency to the winding 59, which in turn establishes an alternating magnetic field around the transducer section 44 of the vibrator unit 40, and which causes the transducer section 44 to vibrate at the selected predetermined frequency and amplitude. Since the casing 52 is formed from a non-magnetic and non-electrical conducting material, it does not impede the establishment of an alternating magnetic field in surrounding relation to the transducer section 44.

Since the transducer section 44 generates heat during vibration, it is desirable to provide a coolant in surrounding relation to the apparatus to maintain the transducer section 44, connecting body 46 and surrounding tubular housing 52 in relatively cool condition. A coolant, such as water, may be supplied to the interior chamber 62 of the tubular housing by a coolant supply capillary 63 which extends from an external coolant supply and through the closure plug 57 for a substantial distance into the cooling chamber 62 to insure adequate distribution of the coolant therein. The warmed coolant is withdrawn through a coolant discharge capillary 64 extending through the closure plug 57 and terminating adjacent the inside face thereof as shown in FIG. 2. The lead wires 60 and coolant supply and discharge capillaries 63 and 64 which extend exteriorly of the closure plug 57, may all be contained within a flexible conduit 65 protected by a flexible guard 66 made in the form of a closely wound tubular wire coil.

The flexible conduit 65 and its flexible protective guard 66 may be connected to the tail end of the tubular casing 52 by means of a nipple adapter 67 which includes a conical wall portion in gripping relation to the terminal end of the flexible conduit 65 and its associated protective guard 66. An internally threaded cylindrical portion extends from the conical portion and is designed to be detachably connected to the adjacent externally threaded extension 56 of the tubular casing 52.

The head end of the tubular casing 52 has a supporting collar 68 detachably secured thereto. The supporting collar 68 includes a tubular body portion having an internally threaded flange extension designed to be threaded onto the externally threaded extension 54 of the tubular casing 52. The other end of the supporting collar 68 also presents an internally threaded flange portion designed for connection to a tubular protective guard 69 which encloses a substantial part of the reduced diameter body section 49 of the connecting body 46 of the vibrator unit 40. The tubular protective guard 69 has a conical wall portion whose contracted mouth extends closely adjacent to but out of contact with the reduced diameter body section 49 of the connecting body 46. An externally threaded cylindrical portion extends from the conical portion and is designed to be threaded into engagement with the adjacent internally threaded flange portion of the supporting collar 68.

The vibrator unit 40 may be held against rotation by means of a polygonally shaped collar portion 70 as shown in FIGS. 2 and 3, which may be formed as an integral part of the enlarged diameter body section 48 of the connecting body 46 and is preferably located in the approximate area of a node of motion thereof. The polygonal collar portion 70 is designed to seat within a corresponding polygonally shaped seat 71 formed on the inside face of the body portion of the supporting collar 68. The inner side of the polygonally shaped seat 71 is defined by an abutment rib extending circumferentially around the inner tubular face of the supporting collar 68. The tubular protective guard 69 may be threaded to the internally threaded flange portion of the supporting collar 68 so that the inner end face of the protective guard 69 will snugly seat against the polygonal collar portion 70 of the connecting body 46, and will thus rigidly clamp the collar portion 70 in the polygonally shaped seat 71 and between the end face of the tubular protective guard 69 and the abutment rib in the supporting collar 68. The supporting collar 68 thus provides a rigid support for the vibrator unit 40 at the approximate area of a node of vibration thereof.

To maintain the coolant within the chamber 62 of the tubular casing 52, a resilient sealing ring 72 may be provided which seats within a circumferential groove formed on the inside face of the supporting collar 68, and makes sealing contact with the enlarged diameter body section 48 of the connecting body 46 in the approximate area of a node of motion thereof. The coolant supplied is thus fully contained in a leak-proof manner within the coolant chamber 62 of the tubular casing; and between the resilient sealing ring 72 and the closure plug 57 thereof.

Where the contact face of the working tip 43 of the trueing tool 42 is relatively pointed and thus of limited area, as shown in FIGS. 1 and 2, the vibrator unit 40 can be of relatively smaller size, and may be vibrated by a biased alternating current input of approximately one hundred to three hundred watts. The vibrator unit 40 should be held against rotation, and against any sliding movement within its housing, since contact pressure must be exerted by the tool contact face against the peripheral working surface of the abrasive wheel in the order of one to ten pounds, where the area of the contact face of the trueing tool is relatively small. In the device shown in FIGS. 1 and 2, the vibrator unit is held against rotation and prevented from undesired longitudinal travel within its housing by the polygonal collar 70 which may be integrally formed as a part of the connecting body 46, and which is clamped and locked in the polygonal conforming seat 71 and between the adjacent abutment rib of the supporting collar 68 and the adjacent end face of the tightened tubular protective guard 69.

The mounting structure B which supports the vibrator assembly A is equipped with means for angularly orienting the vibrator unit 40 supported thereby, to thereby angularly orient the contact point of face of the trueing tool 42 as may be desirable during the trueing operation. The mounting structure B is also equipped with means to apply a predetermined but resilient pushing pressure on the unit 40, which is in turn transmitted to the contact point or face of the trueing tool 42, so that the contact face of the trueing tool 42 exerts the desired amount of pressure against the peripheral working surface of the abrasive wheel at the trueing site area. The mounting strucutre B is also equipped with removable and replaceable cam means for both longitudinally and laterally moving the contact face of the trueing tool in predetermined pressure relation to the peripheral working surface of the abrasive wheel so that the working surface is trued to a predetermined geometrical pattern as established by the cam means in operative association with other elements of the mounting structure.

The vibratory assembly mounting structure B may be permanently supported in adjacent relation to the abrasive wheel 73 of almost any type of grinding machine, and for purposes of illustration the mounitng structure B shown in FIGS. 1–5 is illustrated as supported from a fixed table plate 74 forming a part of the grinding or polishing machine. As shown for purposes of illustration, the fixed table plate 74 supports a longitudinally movable table plate 75 which is guided in its longitudinal movement by cooperating tongue and groove guides associated with the fixed table plate 74 and the longitudinally movable table plate 75. A transversely movable table plate 76 may be mounted on and supported by the longitudinally movable table plate 75, with means provided to guide its transverse movement, such as cooperating tongue and groove guides associated with the longitudinally movable and the transversely movable table plates 75 and 76, as indicated in FIGS. 1 and 2. In such an arrangment, suitable means (not shown) would be provided to lock the longitudinally movable and transversely movable table plates 75 and 76 in adjusted position. Numerous other types and forms of support which form a part of various types and kinds of grinding or polishing machines may provide permanent support for the vibrator assembly A and its mounting structure B. However supported, the vibrator assembly A should be held in proper alignment with the peripheral surface of the abrasive wheel to be trued.

The vibrator assembly mounting structure B as shown in FIGS. 1–5 for purposes of illustration, comprises a transversely slidable supporting block 77 which presents a depressed platform section 78 and a raised platform section 79 extending longitudinally therefrom. The transversely slidable supporting block 77 and the transversely movable table plate 76 of the grinding machine are provided with operating tongue and groove guide means, so that the supporting block 77 may be transversely moved in relation to the peripheral surface of the abrasive wheel 73 to be trued. A longitudinally slidable supporting block 80 is slidably supported on the raised platform section 79 of the transversely slidable supporting block 77. The transversely slidable and longitudinally slidable supporting blocks 77 and 80 may be provided with cooperating tongue and groove guide means for guiding the longitudinal movement of the guide block 80.

The longitudinally slidable guide block 80 is provided with an upwardly projecting cradle section 81, as shown in FIGS. 1, 2 and 3, which extends transversely across the supporting block 80 and may be formed integral therewith. The cradle section 81 has a semi-cylindrical cut-out which presents arcuately shaped cradle faces 82 in which the supporting collar 68 of the vibrator assembly A may be snugly pocketed. The cradle section 81 is provided with a cover plate which presents a seim-circular intermediate section 83 having an arcuately shaped interior cradle face designed to embrace the upper half of the supporting collar 68 of the vibrator assembly A. The cover plate also includes end wings 84 which are designed to snugly seal against the upper face of the cradle section 81 and may be clamped thereto by suitable clamp bolts 85, one of which may be provided with a handle 86 for adjusting the clamping force applied by the collar.

When the bolts 85 are tightened, the exterior circumference of the supporting collar 68 is snugly clamped between the inner arcuate face of the section 83 of the cover plate and the arcuate cradle face 82 of the cradle section 81 to thereby firmly hold the vibrator assembly A and associated vibrator unit 40 against relative rotation, and yet permit angular orientation of the vibrator assembly A and its vibrator unit 40 and trueing tool 42, to any degree desired, by loosening the handle 86.

Micrometer means are provided for angularly rotating the vibrator assembly A and its rigidly held vibrator unit 40 and associated trueing tool 42, so that the working point or face of the trueing tool may be angularly oriented precisely as desired to best perform the required trueing operation. As shown in FIGS. 1, 2 and 3, the supporting collar 68 of the vibrator assembly A may be provided with a circumferentially extending ring gear 87 projecting laterally from its body section and which may be formed integral therewith. The arcuate faces of the cradle section 81 and cover plate 83 may be provided with a corresponding circumferential groove 88 to receive the ring gear 87. A worm gear 89, fixed to a transversely extending rod 90 which is journaled in a transversely extending bore formed in the cradle section 81 is pocketed within a suitable recess formed in the cradle section 81, and is positioned to mesh with the ring gear 87, as shown in FIG. 3. The worm gear supporting rod 90 has a manipulating knob 91 fixed to the projecting end thereof, and which presents a flared skirt or collar portion 92 having suitable indicia formed around its circumference to indicate the angularly oriented position of the vibrator assembly A, its vibrator unit 40 and the contact end of the trueing tool attached thereto.

The mounting assembly B is equipped with a pair of cam plates 93 and 94 secured together in spaced relation by a spacing collar 95 and mounted for rotation on a vertically extending stub shaft 96 whose lower end is rotatably supported by a thrust bearing assembly 97 set within the depressed platform section 78 of the transversely slidable guide block 77 as shown in FIGS. 1, 2 and 5. The cam plates 93 and 94 and associated spacing collar 95 are removably locked to the upwardly projecting end portion of the stub shaft 96 by means of a vertically extending lock key 98. The cam plate assembly 93, 94, 95 is held in locked position by means of a lock nut 99 applied to the threaded terminal end of the stub shaft 96.

The cam plates 93 and 94 and associated spacing collar 95 are rotated as a unit by means of a gear wheel 100 keyed to the stub shaft 96 as by key 98, as shown in FIGS. 1, 2, 4 and 5. A worm gear 101 is fixed to a shaft 102 which may be rotated by a hand wheel 103 fixed to the other end thereof. The worm gear 101 is positioned to mesh with the gear 100 and its manipulating shaft 102 may be rotatably journaled in suitable bearing blocks 104 fixed to the depressed platform section 78 of the transversely slidable guide block 77. A bracket 122 may be fixed to the guide block 77 to support the shaft 102 (FIGS. 4 and 5).

The upper cam plate 93 has a peripheral camming track which is contoured to deliver a longitudinal travel component to the contact face of the trueing tool 42 when its vibrator assembly A is supported by the mounting structure B as above described. The lower camming plate 94 has a peripheral camming track designed to establish the transverse path of travel of the contact face of the trueing tool 42 as supported by the vibrator assembly A and its mounting structure B as above described. The peripheral working surface of the abrasive wheel can be trued and re-formed to the precise geometrical contour desired by making the camming peripheries of the cooperating cam discs 93 and 94 of the required predetermined contour, and by angularly orienting the cooperating cam discs in proper fixed relation and then rotating them in unison as a unit.

Predetermined longitudinal movement of the longitudinally slidable supporting block 80 in conformity with the camming periphery of the cam plate 93, is accomplished by means of a cam roller 105 which is held in resilient riding contact with the camming periphery of the cam disc. The cam roller is rotatably journaled on a roller shaft 106 secured to the forked arms of a rigid bracket 107 which is secured as by bolts 108 to the adjacent end face of the longitudinally slidable supporting block 80. The cam roller 105 is maintained in resilient contact with the peripheral camming surface of the cam plate 93 by means of a coiled compression spring 109 pocketed within a longitudinally extending bore 110 drilled into the longitudinally slidable supporting block 80. The coiled compression spring 109 is supported by a rod 111 which extends therethrough. One end of the supporting rod 111 extends into a conforming hole formed in the block 80, and is thereby supported, and its other end is supported by a vertically extending strut 112 which may be rigidly secured as by screws 113 to that end of the transversely slidable supporting block 77 which is next adjacent the grinding wheel 73 as shown in FIGS. 1 and 2.

The compression spring 109 is maintained under compression between the rod supporting strut 112 and the bottom end of the spring receiving bore 110 and serves a double purpose: namely, to maintain the cam roller 105 in riding contact with the peripheral camming surface of the cam plate 93, and to establish the desired contact pressure between the contact face of the trueing tool 42 and the peripheral working surface of the abrasive wheel. Accordingly, a coiled compression spring 109 of predetermined compression characteristics is selected for this purpose.

The peripheral camming surface of the lower cam disc or plate 94 is designed to travel in contact with a cam roller 114 when the cam plates 93 and 94 are rotated as a unit by the hand wheel 103. The cam roller 114 is journaled on a stub shaft 115 fixed to the forked arms of a supporting bracket 116 which is secured as by screws 117 to the upper end of the vertically extending strut 118 fixed to the adjacent side face of the table plate 76 of the grinding machine, as shown in FIGS. 1 5. The cam roller 114 is maintained in riding contact with the peripheral camming surface of the cam plate 94 by means of a tension spring 119 supported by an elongated bolt 120, one end of which is threaded into the adjacent face of the depressed platform section 78 of the transversely slidable supporting block 77. The tension spring 119 is compressed between the adjacent face of the supporting strut 118 and an adjustable lock nut 121 attached to the threaded terminal end of the tension spring supporting bolt 120 as shown in FIG. 5. The coiled tension spring 119 applies a predetermined pulling force on the transversely slidable supporting block 77 which supports the upwardly projecting stub shaft 96 to which the cam plate 94 is secured, and which thus maintains the peripheral camming surface of the cam plate 94 in resilient contact with the cam roller 114 at all times.

When the peripheral working surface of the abrasive wheel is to be trued to present a truly flat working surface across the entire width thereof, a camming unit would be mounted on the stub shaft 96, which included a camming disc 94 having a generally convolute camming periphery to thereby move the contact face of the trueing tool 42 transversely across the peripheral working surface of the abrasive wheel so as to make the working surface truly circular across the entire width thereof, but the camming disc 93 which establishes the longitudinal travel of the contact face of the trueing tool 42 would have a circular camming periphery so that no longitudinal movement of the contact face of the trueing tool 42 would be established.

When the peripheral working surface of the abrasive wheel is to be trued to an irregular geometrical configuration across the width thereof, the peripheral camming surfaces of the cam discs 93 and 94 would be appropriately shaped to establish the desired geometrical path of travel of the working tool contact face to thereby true the peripheral working surface of the abrasive wheel to a geometrical contour of selected configuration.

By way of illustration, FIG. 6 diagrammatically illustrates the geometrical camming surface shape which the cooperating camming discs 93 and 94, when rotated in unison, should possess when the peripheral working surface of the abrasive wheel is to be trued to the configuration shown in FIG. 6. In trueing the peripheral working surface of the abrasive wheel to the geometrical configuration S shown in FIG. 6, the contact end of the trueing tool must travel the longitudinal distance L while it travels across the width of the peripheral working surface W. Considering point $a$-$a'$ as the starting point at the extreme peripheral edge of the abrasive wheel 73, the cam disc 93 shaped as shown in FIG. 6 and which establishes the longitudinal movement, would be set with its high point $a$ in contact with cam roller 105. The corresponding low point $a'$ of the cam disc 94, which establishes the transverse travel, would be set in contact with the cam roller 114.

With the cam discs 93 and 94 rotating in unison in a clockwise direction as indicated in FIG. 6, the cam disc 93 establishing the longitudinal travel would progressively move into contact with its cam roller 105 along its cam surface points, $b$, $c$, $d$, $e$, $f$, $g$ and $h$, which are radially spaced from the axis of rotation $x$ in decreasing order. The corresponding cam surface points $b'$, $c'$, $d'$, $e'$, $f'$, $g'$ and $h'$ of the cam disc 94 and which establish the transverse movement, would progressively advance into contact with the cam roller 114, and since these points are radially spaced a progressively further distance from the axis of rotation $x$, the contact face of the trueing tool 42 would travel a transverse distance W across the width of the peripheral working surface of the abrasive wheel. By the combined action of the cam discs 93 and 94 having camming peripheries of proper shape, and angularly oriented as indicated in FIG. 6, and rotated in unison, a geometrical pattern of movement of the contact face of the trueing tool 42 can be established which insures precise trueing of the peripheral working surface of the abrasive wheel to the precise geometrical pattern S desired.

By substituting other sets of cam discs assembled as a unit, and whose peripheral camming surfaces are appropriately and geometrically shaped, and fixed together in proper oriented relation and roated in unison, the peripheral working surface of an abrasive wheel can be trued to any selected geometrical pattern. By selecting a compression spring 109 of proper compression characteristics, a substantially uniform and predetermined contact pressure can be established between the working end of the trueing tool 42 and the peripheral working surface of the abrasive wheel.

In using the apparatus shown in FIGS. 1–5, the entire assembly is initially positioned by means of guide blocks 75 and 76 so that the tip of the tool 42 is just at the edge of the working surface of the abrasive wheel 73. At the same time, the cam discs 93 and 94 are rotated by means of hand wheel 103 until they are properly aligned for the beginning of the forming operation, such as shown in FIG. 6. Alternating current power is applied to the coil 59 to set the transducer section 44, connecting body 46 and tool 42 into longitudinal vibration of the preferred amplitude and frequency, e.g. an amplitude of the order of one to two thousandths of an inch or less and a frequency of less than 20,000 c.p.s. and preferably in the neighborhood of 5,000 to 20,000 c.p.s. The abrasive wheel is rotated relatively slowly, providing a surface speed in the order of less than one foot to a preferred maximum of five feet per second. A liquid coolant, such as water or a detergent liquid, is applied to the contact area through a supply conduit 123 (FIG. 2).

The handwheel 103 is now manually rotated to rotate the cam discs 93, 94 and thereby move the tool 42 across the face of the wheel 73 in accordance with the present pattern, as described hereinabove. As the tool 42 contacts the wheel 73, the combined effect of the pressure exerted by the cam disc 93 and the spring action of spring 109 maintains the tool tip 43 against the wheel 73 with the preferred force, in the order of 1 to 20 pounds. Under these conditions, the light but rapid impact stroke delivered by the tool tip 43 to the non-conforming surface grains of the abrasive wheel, loosen these grains and they are washed away by the coolant. The loosening and removal of the grains is facilitated by the cavitational action engendered in the coolant fluid as it flows past the vibrating tool tip 43.

One or more passes of the tool tip 43 across the face of the wheel may be necessary to complete the forming operation, depending on the final contour desired. While manual means are illustrated for rotating the cam discs, it will be readily apparent that motor drive means may also be employed.

The trueing device illustrated in FIGS. 7–19 comprises a vibrator assembly A′ which incorporates a vibrator unit 130 having a trueing tool fixed thereto whose working or contact face is sized and formed to true the entire width of the peripheral working surface of the abrasive wheel during relatively slow rotation thereof. Accordingly, this vibrator assembly is supported by a mounting structure B′ which need have no transverse travel in relation to the transverse width of the peripheral working surface of the abrasive wheel, but is nevertheless equipped with means for supplying a predetermined pressure force on the vibrator assembly A′ and the vibrator unit 130 associated therewith so that the contact face of its trueing tool is maintained at a predetermined pressure against the peripheral working surface at the trueing site area of the abrasive wheel.

Where the contact face of the trueing tool has a width to extend across the entire peripheral working surface of the abrasive wheel, along with a sufficient arcuate length, to insure effective contour trueing across the entire width of the peripheral working surface without lateral travel of the contact face, the vibrator unit 130 would be more heavily constructed than the vibrator unit 40 shown in FIGS. 1 and 2 and previously described, whose trueing tool presents a trueing point or contact face of relatively small area. To provide a vibrator assembly A′ and associated vibrator unit 130 of sufficient strength and power so that the contact face of the trueing tool may effectively true the entire width of the peripheral working surface of the slowly rotating abrasive wheel, the vibrator unit 130 associated with the trueing assembly A′ may be constructed as illustrated in FIGS 13 and 14. In this form of vibrator assembly A′, its vibrator unit 130 presents a transducer section 131 which may be generally rectangular in cross-section, and formed from a multiplicity of stacked metal plates each of which may be slightly arcuate in cross-section as illustrated in FIGS. 13 and 16. The stacked metal plates which compose the transducer section 131 may be compactly held in assembled relation by means of an insert slug 132 set within a conforming slot extending transversely across the stacked plates at the free end thereof, and bonded into position as by silver solder. Each of the stacked metal plates may be formed from a metal such as permanickel, Permendur, or other metal having high tensile strength and highly magnetostrictive in character, so that the transducer section 131 will longitudinally vibrate to a maximum degree when subjected to the influence of an alternating magnetic field.

The output end of the transducer section 131 is rigidly secured as by welding or soldering to the input end of an amplitude magnifying connecting body 133, often referred to in the art as an acoustical impedance transformer. The connecting body 133 presents an enlarged body section 134 which may be somewhat similar in rectangular cross-section but somewhat larger than the cross-sectional area of the transducer section 131. The connecting body 133 also includes a reduced body section 135 which may be made of somewhat lesser depth but substantially the same in width as the enlarged body section 134 to which it is integrally joined by a tapered neck section 136, as shown in FIGS. 13 and 14. Any desired form of tool head may be rigidly secured or bonded to the output end of the connecting body 133, or the output end face of the connecting body 133 may itself provide the trueing face 137 of the tool as pressure is applied to the peripheral working surface of the abrasive wheel.

Where the peripheral working surface of the abrasive wheel is to be made substantially flat across the width thereof, the contact face 137 of the trueing tool or head is made correspondingly straight transversely across the width thereof as shown in FIG. 13. Where the peripheral working face of the abrasive wheel is to be trued to a curvilinear geometrical pattern, the contact face 137 of the trueing tool or head would be correspondingly reversely shaped as indicated in FIG. 7. Where the peripheral working surface is to be trued to a pronounced curvilinear pattern, as shown in FIG. 7, such curvilinear pattern may best be obtained if the contact face 137 of the trueing tool is made to execute a generally elliptical, circular or orbital motion pattern, affected by making a flexural producing depression 138 in the vertical side edge of the reduced body section 135 of its connecting body 133 as indicated in FIG. 7. The flexural producing depression 138 is of such predetermined shape and form as to establish the desired orbital motion at the working end of the trueing tool, as hereafter more fully explained.

The connecting body 133 may be made of a strong metal such as tool steel, Monel metal, titanium, Phosphor-bronze, brass or beryllium copper or the like having high tensile strength. The trueing tool may be formed from a similar metal and integrally formed as a part of the connecting body 133. Alternatively, the trueing tool may be a separate element formed of a metal different from the metal of the connecting body 133, but should be characterized by high tensile strength and maximum wear resistance, and rigidly secured to the output end of the connecting body 133 as by welding or soldering. It will also be appreciated that the working end face of the trueing tool may be formed of or surfaced with a particularly hard and wear-resistant material such as tungsten carbide, industrial diamonds or the like, so that the working end face of the trueing tool will maintain its precise geometrical shape substantially indefinitely in use.

The transducer section 131 of the vibrator unit 130 should have a length corresponding to one-half wavelength or multiples thereof at the vibration frequency of the transducer section, and the combined length of the connecting body 133 and trueing tool attached thereto should have a length corresponding to one-half wavelength of multiples thereof at the vibration frequency of the transducer section 131. The transducer section 131, connecting body 133, and trueing tool combined as a unit, should be designed to produce longitudinal motion strokes at the working or contact end face 137 of the trueing tool which is in the order of one- to two-thousandths of an inch or less. The length of the longtiudinal motion strokes as well as the length of the lateral motion strokes to be executed by the contact face of the trueing tool, may be designed into the vibrator unit in accordance with the acoustical characteristics of the metals of which it is formed, the frequency of vibration and the shape and form of its components. The preferred orbital motion pattern which the contact face of the trueing tool should execute for most effective trueing action, is determined from the geometrical contour to be produced at the working surface of the abrasive wheel, and the grain size, grain hardness and characteristics of the grain bonding matrix of which the working surface of the abrasive wheel is composed.

The transducer section 131 and the major part of the connecting body 133 of the vibrator unit 130 is contained within a tubular casing 139 fromed of a nonmagnetic and non-electrical conducting material such as nylon or like moldable plastic compound as shown in FIGS. 13 and 14. The tubular casing 139 presents an intermediate body section which may be generally rectangular in cross-sectional contour but whose interior cross-section is substantially larger than the rectangular cross-sectional area of the transducer section 131 contained therein as shown in FIG. 16. The rectangular body section merges into a cylindrical head section and a cylindrical tail section through tapered funnel shaped portions.

Several layers of enamel coated current conducting wire 140 are wound around the rectangular body section of the tubular casing 139, with the lead wires 141 which extend from the winding 140 threaded through a longitudinal slot formed in the cylindrical tail section of the tubular casing. A tubular jacket 142 is telescoped over and supported by the cylindrical head and cylindrical tail sections of the tubular casing 139 and provides protection for the winding 140. The lead wires 141 from the winding 140 extend to a coupling box 143 positioned adjacent the tail end of the housing, and are thence connected to current supply wires 144 contained in a flexible conduit 145 and joined to a source of biased alternating current of selected frequency. An alternating current generator (not shown) is connected to the current supply wires 144 and supplies the biased alternating current of desired frequency to energize the winding 140 and produce an alternating magnetic field in surrounding relation to the transducer section 131 of the vibrator unit 130. Since the tubular casing 139 is composed of a non-magnetic and non-conducting plastic compound such as nylon, no impediment is offered thereby to the establishment of an alternating magnetic field in surrounding relation to the transducer section 131 to thereby acoustically vibrate the transducer section 131 in harmony with the frequency of the supplied biased alternating current at an amplitude which is in conformity with the acoustical characteristics of the metal from which the transducer section 131 is constructed.

The vibrator unit 130 is supported by a sturdy mounting ring 146 which may be formed of metal and which present an internal body wall 147 having an axial conforming hole 148 therein through which the connecting body 133 of the vibrator unit 130 extends, as shown in FIGS. 13, 14 and 15. The vibrator unit 130 is firmly supported within the conforming hole 148 by means of a pair of supporting pins 149 set within the internal body wall 147 of the tubular mounting ring 146 and which present rounded or conical terminal ends which are pocketed within conforming cavities formed in the adjacent side face of the enlarged body section 134 of the connecting body 133 as shown in FIGS. 14 and 15. An adjustable clamping screw 150 presents a threaded body section which is threaded into a threaded hole formed in the internal body wall 147 of the tubular mounting ring 146, and whose rounded terminal end may be manipulated into seating position within a conforming cavity formed in the opposite side of the enlarged body section 134 of the connecting body 133 as shown in FIGS. 14 and 15. The supporting pins 149 and clamping screw 150 are positioned to engage the connecting body 133 of the vibrator unit 130 in the approximate area of a node of vibration thereof. By loosening the clamping screw 150, the connecting body 133 and the transducer section 131 can be withdrawn from the housing 139. The tubular mounting ring 146 and associated supporting pins 149 and clamping screw 150 may provide the only support for the transducer and connecting body assembly. The tubular mounting ring 146 presents a forwardly projecting guard flange 151 of any desired longitudinal length which serves to provide protection for a part of the connecting body 133 which extends beyond the exterior face of the body wall 147 of the tubular mounting ring 146. The tubular mounting ring 146 may also be provided with an inset supporting flange 152 at the inner end thereof which is designed to telescope into the adjacent end of the cylindrical head section of the tubular casing 139. Suitable screws 153 or like means may be used to secure the cylindrical head section of the casing 139 to the inset supporting flange 152.

Since the transducer section 131 generates heat during vibration, a coolant is provided to maintain the transducer section 131, connecting body 133 and the surrounding housing in relatively cool condition. The coolant may take the form of a stream of cooling air which is forced through the tubular casing 139 by the provision of a cooling fan 154 positioned at the tail end of the tubular casing 139, as shown in FIGS. 13 and 14. The cooling fan 154 is fixed to a fan shaft 155 which is driven by a variable speed motor 156 to which energizing current is supplied by a current line 157 connected to terminals in the connection box 143, and which are in turn detachably connected to current supply wires 158 contained in the flexible conduit 145 which also contains the energizing wires 144 which supply current to the biased alternating current winding 140.

The cooling fan 154 and its driving motor 156 may be supported by a suitable supporting spider presenting radial arms 159 suitably secured to the interior surface of the cylindrical tail section of the tubular casing 139. The radial arms 159 are radially separated to provide for an adequate supply of inflow air therebetween, and may be connected to a mounting ring 160 secured as by set screws to the stationary hub portion 161 of the fan motor 157. The tail end of the tubular housing may also be provided with a closure cover 162 having a perforated end wall and a cover flange designed to frictionally telescope over the adjacent circular tail section of the tubular casing 139.

The cooling fan 154 operates to draw a stream of exterior cooling air into the cylindrical tail section of the tubular casing, then force the air through the constricted portion of the casing 139 and into surrounding relation to the heated transducer section 131 and a portion of the connecting body 133 of the vibrator unit, and then into the cylindrical head section of the casing 139, from which the air is exhausted through the exhaust ports arranged in spaced relation around the body wall of the cylindrical head section. The cooling air may be prevented from escaping through the connecting body insertion hole 148 of the tubular mounting ring 146 by placing a sealing diaphragm 164 against the inside face of the internal body wall 147 of the tubular mounting ring 146 to thereby substantially seal the connecting body insertion hold 148 and prevent the escape of cooling air therethrough.

For most of the trueing operations encountered, the transducer-connecting body combination, 131, 133, would not substantially exceed twelve inches in length, and would in most cases be made in the order of approximately six to nine inches in length. Since this assembly is made of heavy metal, it would normally be of substantially greater weight than the housing within which a substantial part of it is enclosed, since the tubular casing 139 and its tubular jacket 142 can be made of a relatively light but tough plastic compound such as nylon, and the tubular mounting ring 146 which provides the sole support for the assembly can be made of a relatively light metal such as aluminum.

The interior of the tubular casing 139 which provides the cooling chamber, is correspondingly limited in volume, and a cooling fan 154 having the capacity to move approximately ten cubic feet of air per minute, would normally be sufficient to provide the desired cooling for the vibrating transducer section 131 and connecting body 133. Accordingly, a relatively small fractional horsepower fan motor 156, whose outer shell can be made of a tough plastic compound to lighten its weight, would be sufficient to drive the cooling fan 154.

In view of the relatively small amount of power required to drive the cooling fan 154, the cooling fan shaft 155 may be rotated by a flexible drive shaft 165 secured to the end of the fan shaft 155 as shown in FIGS. 18 and 19, and which flexible shaft may be driven by a motor contained within the enclosing cabinet of the biased alternating current generator (not shown). The flexible drive shaft 165 can be contained within a secondary flexible conduit 166 as shown in FIGS. 18 and 19, and which secondary flexible conduit 166 may be contained within a primary flexible conduit 167 through which the alternating current supply wires 144 leading to the generator may also be contained, and which may be detachably connected by a prong and socket coupling 168 to the lead wires 141 of the winding 140.

Where a flexible drive shaft 165 is employed to drive the cooling fan 154, the fan shaft may be supported by a bearing assembly 169 contained within a supporting sleeve 170, and to which the outer flexible conduit 167 would be secured as by means of an internal clamp ring 171 as shown in FIG. 18. An abutment collar 172 may be secured to the fan shaft 155 to maintain the shaft and its cooling fan 154 in operative position.

The tail end of the tubular casing 139 and the cooling fan 154 contained therein may be enclosed by an end closure 173 which presents a conical end portion whose contracted end may be positioned to seat against an abutment shoulder integral with an extending circumferentially around the supporting sleeve 170, and clamping in locking abutment therewith by a slidable clamping ring 174 whose position may be fixed by a set screw. The conical end portion of the end closure 173 may be provided with ample air inlet openings as defined between the radial struts 175 of the conical portion.

A cylindrical body portion extending from the outer periphery of the conical portion of the end closure 173 is designed to snugly telescope over the adjacent exterior face of the cylindrical tail section of the tubular casing 139 and may be detachably secured thereto as by suitable set screws. The cooling fan 154 and fan shaft 155, flexible drive shaft 165, flexible conduits 166 and 167, the supporting sleeve 170, bearing assembly 169, abutment collar 172, internal conduit clamp ring 171 and slidable abutment collar 174 may be assembled as a unit with the end closure 173, before the cylindrical portion of the end closure 173 is attached to the cylindrical tail section of the tubular casing 139.

The mounting structure B' which supports the vibrator assembly A' as shown in FIGS. 7–12 is equipped with means for angularly orienting the vibrator unit 130 supported thereby, to thereby angularly orient the contact or shaping face 137 of the trueing tool 135 with respect to the abrasive working face of the grinding wheel 73 to be trued. The mounting structure B' is also equipped with means for applying a predetermined pushing pressure on the unit 130 so that the contact face of the trueing tool exerts the desired pressure against the peripheral working surface of the abrasive wheel at the trueing site thereof. The mounting structure B' is also provided with means for slidably supporting the vibrator assembly A' in precise trueing position, with adjustable means for maintaining the contact face of the trueing tool in precise trueing relation to the working face of the grinding wheel. Means are also provided for swingably supporting the vibrator assembly A' in a manner so that it may be swung to one side of the grinding wheel to facilitate ready removal of the transducer-connecting body assembly from the mounting structure and removal of the vibrator unit 130 from the vibrator assembly.

The vibrator assembly mounting structure B' includes a channel shaped supporting tray 180 which may be permanently supported in adjacent relation to the abrasive wheel 73 of almost any type of grinding machine, and may be supported from a fixed table plate 181 forming a part of the grinding or polishing machine. As shown in FIGS. 8 and 10, the fixed table plate 181 may be designed to support a transversely movable table plate 182 which is guided in its transverse movement by cooperating tongue and groove guides associated with the fixed table plate 181 and the transversely movable table plate 182. A longitudinally movable table plate 183, mounted on and supported by the transversely movable plate 182, may be guided in its longitudinal movement by cooperating tongue and groove guide associated with the longitudinally movable plate 183 and transversely movable plate 182. The bottom wall of the channel shaped supporting tray 180 may be fixed to the longitudinally movable plate 183 in a manner so that its longitudinal center line extends normal to the axis of the grinding wheel. Suitable means may be associated with the transversely movable table plate 182 and longitudinally movable table plate 183 to maintain the center line of the channel shaped supporting tray 180 in adjustably fixed relation to the plane of rotation of the grinding wheel.

The channel shaped supporting tray 180 includes parallel side walls which may be integral with its bottom wall. The side walls present a pair of upwardly extending abutments 184 at the tail end thereof and a pair of upwardly extending abutments 185 at the head end thereof. A pair of slide rails or rods 186 extends between the tail and head abutments 184 and 185. The tail end of each rod 186 is secured as by a pivot screw 187 to the tail abutment 184. The head end of each slide rod 186 is adjustably connected to its head abutment 185 by a set screw 190 and may be leveled by means of a micrometer screw 191 threaded through the head end of the slide rod and into abutting relation to a shoulder presented by the head abutment 185.

The vibrator assembly A' is slidably supported on the guide or slide rods 186 by a carriage which includes an underslung member 192 presenting a bottom wall and side walls which extend into the channel shaped supporting tray 180, as shown in FIG. 11. A pair of spaced slide blocks 193 projects laterally from each side wall of the underslung member 192. Each slide block 193 has a bearing sleeve through which the adjacent guide rod 81 extends, and which insures smooth longitudinal reciprocation of the underslung member 192 along the guide rods 186.

The vibrator assembly A' is supported by a pair of split clamp rings 194 and 195 designed to embrace the tubular housing of the vibrator assembly A' at the tail end and the head end thereof. The tail clamp ring 194 has a projecting hinge knuckle 196 pivotally connected as by pivot pin 197 to a pivot stud 198 projecting upwardly from one of the tail slide blocks 193. The lower section of the tail clamp ring 194 is provided with a laterally projecting foot 200 designed to overlap the upper face of the opposite tail slide block 193 and is detachably secured thereto as by a finger manipulated set screw 201. The upper section of the tail clamp ring 194 is provided with a laterally projecting lip portion 202 designed to overlap the adjacent projecting foot 200 and is detachably secured thereto as by a clamp screw or bolt 203. The tail clamp ring 194 is desirably formed of resilient metal or plastic with spring characteristics, and when clamped in closed position by the clamp bolt 203, has an internal surface diameter corresponding to the diameter of the tail end of the tubular housing of the vibrator assembly A', so that the clamp ring 194 can be drawn into surrounding clamping relation to the tail end of the housing when the clamp bolt 203 is tightened.

The split clamp ring 195 at the head end of the mounting structure B' is also formed from resilient metal or plastic material of spring characteristics. A hinge knuckle 204 projects laterally from the head clamp ring 195 and is pivotally connected as by pivot pin 205 to a stud 206 projecting upwardly from the adjacent slide block 193, with the pivot pin 205 in axial alignment with the pivot pin 197. The lower section of the head clamp ring 195 is provided with a laterally projecting foot 207 designed to seat against the top surface of the opposite slide block 193 and may be detachably secured thereto as by a finger manipulated set screw 208. The upper section of the head clamp ring 195 is provided with a laterally projecting lip portion 210 which may be detachably secured to the projecting foot 207 by a clamp screw or bolt 211.

The upper section of the head clamp ring 195 supports a worm gear stud 212 contained within a worm gear housing 213 which may be formed as an integral part of the upper section of the clamp ring. The worm gear stud 212 presents an external manipulating head 214 by means of which the worm gear stud 212 may be rotated. The worm gear forming a part of the worm gear stud 212 is designed to mesh with a ring gear 176 formed in the external surface of the tubular collar 146 of the vibrator assembly housing as shown in FIGS. 10, 13 and 14, and the interior surface of the head clamp ring 195 may be provided with a circumferentially extending groove formation 215 to provide an appropriate pocket for the reception of the ring gear 176, The vibrator assembly A' may be mounted in the tail and head clamp rings 194 and 195 by loosening the clamp bolts 203 and 211 to permit the upper sections thereof to spring open to thereby increase the internal diameter of the clamp rings, releasing the projecting feet 200 and 207 of the clamp rings from the slide blocks 193, and then swinging the clamp rings 194 and 195 upwardly to a position where the longitudinal axis of the clamp rings is positioned to one side of the plane in rotation of the grinding wheel as shown in FIG. 12. The tubular body of the vibrator assembly A' can then be longitudinally inserted into the expanded and upswung clamp rings 194 and 195 and the ring gear 176 pocketed within the groove formation 215 of the head clamp ring 195. The upswung clamp rings 194 and 195, with the vibrator assembly A' supported therein, may then be swung downwardly to operative position and the projecting feet 200 and 207 thereof secured to the adjacent slide blocks 193 by the securing studs 201 and 208. The clamp bolts 203 and 211 may then be loosely secured to the projecting feet 200 and 207. The vibrator assembly A' may then be rotatably oriented by manipulating the worm gear stud 212 by means of knob 214 to thereby adjust the contact face 137 of its trueing tool 135 in precise trueing relation to the periphery of the grinding wheel to be trued. When this adjustment has been made, the clamp bolts 203 and 211 may be tightly secured to rigidly clamp the vibrator assembly A' in its adjusted position.

It will also be noted that the transducer-connecting body assembly may also be conveniently and removably replaced while its vibrator assembly A' is supported by the clamp rings 194 and 195, by swinging the clamp rings upwardly as shown in FIG. 12, and then loosening the clamp screw 150 which secures the connecting body 133 to the tubular supporting collar 146 of the vibrator assembly. Occasional replacement of the transducer-connecting body assembly may be made when the contact face 137 of its trueing tool has become worn as a result of a preceding trueing operation, or when it is desired to employ an assembly having an alternate tool contact face 137 contoured to form a corresponding contour in the peripheral surface of the grinding wheel.

The supporting structure B' is also equipped with means for maintaining the shaping face 137 of the trueing tool associated with the vibrator assembly A' in predetermined pressure contact with the peripheral working surface of the grinding wheel. As shown in FIGS. 7–11, the pressure applying means may comprise a wire cable 216, one end of which is attached as by an attaching stud 217 to the bottom wall of the underslung carriage member 192. The cable 216 is trained around a guide pulley 218 rotatably journaled on a shaft pin 219 secured to the underface of the bottom wall of the channel shaped supporting tray 180 adjacent the head end thereof, with the upper section of the guide pulley 218 projecting through a receiving hole formed in the bottom wall. The lower reach of the cable 216 is threaded through a suitable slot or bore formed in the longitudinal slide plate 183 and is thence trained around a rear guide pulley 220 rotatably journaled on a pin shaft 221 supported by a bracket 222 secured to the underface of the bottom wall of the supporting tray 180 adjacent the tail end thereof. The terminal end of the tension cable 216 has a main counter-weight 223 attached thereto upon which added weights 224 may be stacked, as shown more particularly in FIGS. 8 and 9. Sufficient supplemental weights 224 may be stacked upon the main counter-weight 223 to establish the desired pressure contact between the shaping face 137 of the trueing tool and the peripheral surface of the grinding wheel to be trued.

The apparatus shown in FIGS. 7 to 19 is positioned for operation longitudinally and transversely with respect to the abrasive wheel 73 by means of support blocks 182 and 183, which may be suitably locked in position by any well-known means. The vibrator assembly 130 is properly positioned in split ring clamps 194, 195, and the tool face 137 oriented rotationally by adjustment of dial 214. The clamp bolts 203 and 211 are then tightened to fix the assembly 130 in the desired position.

Alternating current power is supplied to the windings 140 in the vibrator unit (FIG. 14) and the transducer-connecting body assembly is set into vibration at the frequency of the applied alternating current. With the grinding wheel 73 rotating slowly, sufficient weights 224 are applied to the tensioning arrangement to press the tool face 137 against the grinding wheel with the requisite force. As in the apparatus of FIGS. 1 through 6, water, or some other detergent liquid capable of supporting cavitation is applied to the impact area through a conduit 123. As the wheel face is trued by the repetitive impacts provided by the vibrating tool, the weights 224 continually maintain the desired pressure between the tool face and the wheel. The combined action of the repetitive impacts and the cavitation induced in the liquid at the surface of the wheel serve to loosen and dislodge the surface grains of the wheel to provide a surface contour reversely conforming to that of the tool face 137.

Referring now to FIGS. 20 through 31, there are shown therein several examples of connecting bodies provided with flexure producing depressions whereby the contact faces execute orbital motion. The tool 230 in FIG. 20 is provided with a contoured trueing face 231 designed to produce a shallow V-shaped groove in the face of the grinding wheel 73. Since this groove subtends a rather large angle $\theta$, a small component of transverse movement of the tool face 231 will be required, in addition to the longitudinal vibration. This motion is achieved by providing a depression 232 in the connecting body of a relatively small depth with respect to the diameter thereof. As shown in the cross-section of FIG. 22, the thickness through the depression $d_1$ is a substantial portion of the overall diameter $D_1$ of the tool shank. A vector representation of the relative components of the vibration is shown in FIG. 23, wherein the longitudinal motion of the tool face is represented by the vector $l_1$ and the transverse component by the vector $t_1$. As shown in FIG. 21, in addition to the contour provided across the face of the tool 231, the tool face is curved longitudinally to conform with the curvature of the wheel, whereby a substantial portion of the peripheral surface of the wheel is subjected to the forming action of the tool face.

The tool face 236 of the tool 235 of FIG. 24 is designed to produce a groove in the face of the abrasive wheel which is V-shaped and which subtends a rather sharp acute angle $\theta_1$. To accomplish this result, a substantially large component of transverse vibration is required and this is provided by the relatively large flexure producing depression 237 provided in the tool. As shown in FIG. 26, the thickness of the tool $d_2$ at the depression area, is a relatively small proportion of the overall diameter thereof $D_2$. This produces the orbital vibration having vector components such as shown by FIG. 27, wherein the transverse component $t_2$ is considerably larger than the longitudinal component $l_2$.

Where the contour to be formed in the face of the grinding wheel includes both obtusely and acutely angled depressions, the tool may be fashioned as shown in FIGS. 28 through 30. The face of the tool, 241, includes a depression-forming ridge subtending an obtuse angle $\theta_2$ as well as an acute angle-forming ridge having an angle $\theta_3$. To achieve the most effective orbital vibration of the tool face, a compromise between the depressions of 232 and 237 is required. For the angles shown in FIG. 28, it has been found that an orbital vibration having substantially equal longitudinal and transverse components is most efficient. This is represented by equal vectors $l_3$ and $t_3$ in FIG. 31. To provide this result, the depression 242 may be made substantially half the diameter of the tool 240, as shown by the relative diameters $D_3$ and $d_3$ in FIG. 30.

It will be apparent from consideration of FIGS. 20 through 31 that innumerable variations of the tool structure may be obtainable, each tailored to provide a particular type of orbital motion at the face of the tool. Accordingly, these embodiments are intended to be merely illustrative of the many possibilities. Furthermore, although a tool having a circular shank portion is illustrated in these figures, a tool of rectangular cross-section, as shown in FIGS. 7, 8, 13 and 14, may be similarly employed. Likewise, although the tools illustrated in FIGS. 20 through 31 are provided with enlarged wheel forming surfaces, it may be advisable under certain conditions to utilize a tool having a wheel engaging surface relatively narrow in respect with the circumference of the wheel.

From the foregoing, it will be seen that many variations in the particular details of the invention described hereinabove will appear to those skilled in the art. Accordingly, this invention is intended to be limited only by the scope of the appended claims.

What is claimed is:

1. A method of forming the surface of an element composed of granular material with a forming tool comprising the steps of, pressing said forming tool against the surface of said element with a relatively small static force, moving said surface relative to said tool, and vibrating said tool at a frequency in the order of five thousand to twenty thousand cycles per second to apply repetitive impacting forces to said surface to loosen the surface grains of said material, the vibration of said tool including substantial components both normal and parallel to the surface of the element.

2. A method for trueing and forming the working surface of an abrasive wheel with a trueing tool comprising the steps of, pressing said trueing tool against the working surface with an applied force in the order of from one to twenty pounds, moving said working surface past said tool at a relative lineal velocity of not more than approximately two feet per second, and vibrating said tool at a frequency of between five thousand and twenty thousand cycles per second and with a relatively small amplitude to apply repetitive impacting forces to said surface to loosen abrasive grains on said working surface.

3. A method for trueing and forming the working surface of an abrasive wheel with an elongated trueing tool disposed generally radially of said wheel and having a trueing tip at one end thereof adapted to contact said working surface comprising the steps of, pressing the trueing tip of said tool against the working surface of said wheel with a relatively small static force, moving said working surface past said trueing tip and vibrating said tool at a frequency of between five thousand and twenty thousand cycles per second and with an amplitude to provide a radial displacement of said trueing tip with respect to said wheel surface of no more than two thousandths of an inch, whereby the repetitive impacting forces applied to said surface by said trueing tip loosen abrasive grains on said surface.

4. A method for trueing and forming the peripheral working surface of an abrasive wheel with a trueing tool comprising the steps of, pressing said tool against the working surface of said wheel with a relatively small static force, rotating said abrasive wheel at a speed substantially lower than its normal working speed to move said working surface past said tool, and vibrating said tool at a frequency in the order of five thousand to twenty thousand cycles per second to apply repetitive impacting forces to said surface to loosen abrasive grains on said surface, the vibration of said tool including substantial components directed both radially and transversely of the abrasive wheel.

5. A method for trueing and forming a contoured peripheral working surface of an abrasive wheel with a trueing tool having a substantially pointed trueing tip comprising the steps of, pressing said trueing tip against the working surface of said wheel with a relatively small static force, rotating said wheel at a speed substantially lower than its normal working speed to move said working surface past said trueing tip, vibrating said trueing tip at a frequency in the order of five thousand to twenty thousand cycles per second to apply repetitive impacting forces to said surface to loosen abrasive grains on said surface, with vibration of said tip including a substantial component directed radially of the wheel, and moving said trueing tip transversely across the peripheral working surface of said wheel along a path conforming to the desired contour of said working surface.

6. A method for trueing and forming a contoured working surface of an abrasive wheel with a trueing tool having a trueing face contoured in reverse conformity to the desired contour to be given to the working surface of the abrasive wheel comprising the steps of, pressing said contoured trueing face against the working surface of said wheel with a relatively small static force, moving said working surface past said trueing face, and vibrating said trueing face at a frequency in the order of five thousand to twenty thousand cycles per second to apply repetitive impacting forces to said surface to loosen abrasive grains on said surface, the vibration of said trueing face including substantial components directed both radially and transversely of the wheel.

7. A method for trueing and forming a contoured peripheral working surface of an abrasive wheel with a trueing tool having a trueing face contoured in reverse conformity to the desired contour to be given to the working surface of the wheel with a relatively small static force, comprising the steps of, pressing said contoured trueing face against the working surface of said wheel, rotating said wheel at a speed substantially lower than its normal working speed to move said working surface past said trueing face, and vibrating said trueing face at a frequency in the order of five thousand to twenty thousand cycles per second and with components both normal and lateral to said working surface to apply repetitive impacting forces to said surface to loosen abrasive grains on said surface, the vibration of said trueing face including substantial components directed both radially and transversely of the wheel.

8. Apparatus for forming and trueing the peripheral working surface of an abrasive wheel rotating at a speed substantially lower than its normal operating speed comprising, an elongated trueing tool having a wheel contacting tip at one end thereof disposed generally radially of said peripheral working surface, means coupled to said tool at its other end and adapted to vibrate said tool longitudinally at a frequency in the order of five thousand to twenty thousand cycles per second, mounting means for said tool to maintain the tip of said tool under pressure against the peripheral working surface of said wheel while said wheel is rotating and said tool is vibrating, whereby surface abrasive grains of said wheel are loosened by the impacting forces applied thereto by said tool tip.

9. Apparatus in accordance with claim 8, wherein said tool is provided with means to produce both longitudinal and transverse components of vibration of said tool tip.

10. Apparatus for forming and trueing the working surface of an abrasive wheel to a desired contour comprising, a relatively elongated trueing tool having at one end thereof a wheel contacting face contoured in reverse conformity to the desired contour of said abrasive wheel, means coupled to said tool and adapted to vibrate said tool at a frequency in the order of five thousand to twenty thousand cycles per second to provide substantial components of vibration both radially and transversely of the wheel, and mounting means for said tool to maintain the face of said tool in contact with the working surface of said wheel while said tool is vibrated, whereby surface abrasive grains of said wheel are loosened by the impacting forces applied thereto by said tool face and said desired contour is achieved.

11. Apparatus of claim 10 wherein said mounting means comprises a slidable bracket member adapted to hold said trueing tool, and means to urge said bracket member towards said abrasive wheel to maintain said tool face against the working surface of said wheel under a predetermined pressure.

12. A method for trueing and forming the peripheral working surface of an abrasive wheel with a trueing tool comprising the steps of pressing said trueing tool against the working surface of said wheel with a relatively small static force, establishing relative movement between said working surface and said tool, and vibrating said tool at a frequency in the order of five thousand to twenty thousand cycles per second to apply repetitive impacting forces to said surface to loosen abrasive grains on said surface, the vibration of said tool including substantial components directed both radially and transversely of the wheel.

13. A method for trueing and forming the working surface of an abrasive wheel with a trueing tool having a substantially pointed trueing tip comprising the steps of pressing said trueing tip against the working surface of said wheel with a relatively small static force, establishing relative movement between said working surface and said trueing tip, and vibrating said tool at a frequency in the order of five thousand to twenty thousand cycles per second to apply repetitive impacting forces to said surface to loosen abrasive grains on said surface, the vibration of said tip including substantial components directed both radially and transversely of the wheel.

14. Apparatus for forming and trueing the working surface of an abrasive wheel comprising, a relatively elongated trueing tool having a wheel contacting tip at one end thereof, means coupled to said tool and adapted to vibrate said tool at a frequency in the order of five thousand to twenty thousand cycles per second to provide a substantial component of vibration radially of the wheel, and mounting means for said tool to maintain the tip of said tool in contact with the working surface of said wheel at a predetermined pressure while said tool is vibrated, whereby surface abrasive grains of said wheel are loosened by the impacting forces applied thereto by said tool tip.

15. Apparatus for forming and trueing the working surface of an abrasive wheel to a desired contour comprising, a trueing tool having a substantially pointed wheel contacting tip, means coupled to said tool and adapted to vibrate said tool at a frequency in the order of five thousand to twenty thousand cycles per second to provide a substantial component of vibration radially of the wheel, mounting means for said tool to maintain the tip of said tool in contact with the working surface of said wheel while said tool is vibrated, and cam actuated means for moving said wheel contacting tip across the working surface of said wheel along a path corresponding to said desired contour, whereby surface abrasive grains of said wheel are loosened by the impacting forces applied thereto by said tool and said desired contour is achieved.

References Cited by the Examiner
UNITED STATES PATENTS

| | | | |
|---|---|---|---|
| 2,580,716 | 1/52 | Balamuth | 51—59 |
| 2,780,214 | 2/57 | Page. | |
| 2,815,744 | 12/57 | Crane. | |
| 2,858,652 | 11/58 | Luthman et al. | |
| 2,926,653 | 3/60 | Kraft. | |

J. SPENCER OVERHOLSER, *Primary Examiner.*

FRANK E. BAILEY, *Examiner.*